(12) United States Patent
Sashima et al.

(10) Patent No.: US 10,234,663 B2
(45) Date of Patent: Mar. 19, 2019

(54) VARIABLE POWER OPTICAL SYSTEM, OPTICAL DEVICE, AND METHOD OF MANUFACTURING VARIABLE POWER OPTICAL SYSTEM

(71) Applicant: Nikon Corporation, Minato-ku, Toyko (JP)

(72) Inventors: Tomoyuki Sashima, Tokyo (JP); Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 11 days.

(21) Appl. No.: 15/331,816

(22) Filed: Oct. 22, 2016

(65) Prior Publication Data

US 2017/0075093 A1    Mar. 16, 2017

Related U.S. Application Data

(63) Continuation of application No. PCT/JP2015/062242, filed on Apr. 22, 2015.

(30) Foreign Application Priority Data

Apr. 25, 2014 (JP) ................................. 2014-091861
Apr. 25, 2014 (JP) ................................. 2014-091862
(Continued)

(51) Int. Cl.
*G02B 15/20* (2006.01)
*G02B 13/00* (2006.01)
(Continued)

(52) U.S. Cl.
CPC ............. *G02B 15/20* (2013.01); *G02B 5/005* (2013.01); *G02B 13/009* (2013.01); *G02B 13/18* (2013.01); *G02B 15/173* (2013.01)

(58) Field of Classification Search
None
See application file for complete search history.

(56) References Cited

U.S. PATENT DOCUMENTS 5,185,678 A    2/1993  Arimoto
5,828,499 A   10/1998  Ohtake
(Continued)

FOREIGN PATENT DOCUMENTS

JP    04-070707 A    3/1992
JP    06-034886 A    2/1994
(Continued)

OTHER PUBLICATIONS

Office Action dated Jul. 25, 2017, in Japanese Patent Application No. 2014-91862.
(Continued)

*Primary Examiner* — Darryl J Collins
(74) *Attorney, Agent, or Firm* — Shapiro, Gabor and Rosenberger, PLLC

(57) ABSTRACT

A variable magnification optical system comprises, in order from an object side: a first lens group having positive refractive power; a second lens group having negative refractive power; a third lens group having positive refractive power; a fourth lens group having positive refractive power; and a fifth lens group; upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, the fifth lens group being moved with respect to the image plane; upon focusing the third lens group being moved along the optical axis; and the given conditional expressions being satisfied; thereby providing a small-size variable magnification opti-
(Continued)

cal system having a high variable magnification ratio and an excellent optical performance.

36 Claims, 17 Drawing Sheets

(30) Foreign Application Priority Data

Apr. 25, 2014 (JP) ................................ 2014-091863
Apr. 25, 2014 (JP) ................................ 2014-091864

(51) Int. Cl.
*G02B 13/18* (2006.01)
*G02B 5/00* (2006.01)
*G02B 15/173* (2006.01)

(56) References Cited

U.S. PATENT DOCUMENTS

| | | | |
|---|---|---|---|
| 5,872,659 | A | 2/1999 | Kohno |
| 5,973,854 | A | 10/1999 | Shimo |
| 2005/0190447 | A1 | 9/2005 | Misaka |
| 2006/0056055 | A1 | 3/2006 | Obama et al. |
| 2006/0119939 | A1 | 6/2006 | Misaka |
| 2007/0070514 | A1 | 3/2007 | Obama |
| 2007/0070515 | A1 | 3/2007 | Obama |
| 2007/0070516 | A1 | 3/2007 | Obama et al. |
| 2007/0217026 | A1 | 9/2007 | Nishimura |
| 2007/0242365 | A1 | 10/2007 | Kushida et al. |
| 2007/0263299 | A1 | 11/2007 | Ohtake |
| 2008/0259464 | A1 | 10/2008 | Kuroda et al. |
| 2009/0323198 | A1 | 12/2009 | Kusaka |
| 2010/0033838 | A1 | 2/2010 | Saori |
| 2010/0091171 | A1 | 4/2010 | Miyazaki et al. |
| 2010/0091174 | A1 | 4/2010 | Miyazaki et al. |
| 2011/0149118 | A1 | 6/2011 | Misaka |
| 2011/0157717 | A1 | 6/2011 | Nanba |
| 2012/0262797 | A1 | 10/2012 | Sugita |
| 2013/0169856 | A1 | 7/2013 | Misaka |

FOREIGN PATENT DOCUMENTS

| | | |
|---|---|---|
| JP | H07-318005 | 12/1995 |
| JP | H08-076016 | 3/1996 |
| JP | H08-122714 | 5/1996 |
| JP | H08-234106 | 9/1996 |
| JP | H09-090226 | 4/1997 |
| JP | 10-161028 A | 6/1998 |
| JP | 10-333037 A | 12/1998 |
| JP | 2002-098893 A | 4/2002 |
| JP | 2002-365548 A | 12/2002 |
| JP | 2004-286960 A | 10/2004 |
| JP | 2005-017915 A | 1/2005 |
| JP | 2005-242015 A | 9/2005 |
| JP | 2005-345968 A | 12/2005 |
| JP | 2006-084740 A | 3/2006 |
| JP | 2006-276711 A | 10/2006 |
| JP | 2007-003554 A | 1/2007 |
| JP | 2007-248952 A | 9/2007 |
| JP | 2007-286446 A | 11/2007 |
| JP | 2007-292994 A | 11/2007 |
| JP | 2007-293051 A | 11/2007 |
| JP | 2007-293052 A | 11/2007 |
| JP | 2009-251114 A | 10/2009 |
| JP | 2009-251118 A | 10/2009 |
| JP | 2009-294513 A | 12/2009 |
| JP | 2010-039426 A | 2/2010 |
| JP | 2011-128371 A | 6/2011 |
| JP | 2011-133740 A | 7/2011 |
| JP | 2012-194278 | 10/2012 |
| WO | WO 2006/095544 A1 | 9/2006 |

OTHER PUBLICATIONS

Office Action dated Jul. 25, 2017, in Japanese Patent Application No. 2014-91863.
Office Action dated Jul. 25, 2017, in Japanese Patent Application No. 2014-91864.
Extended European Search Report dated Oct. 30, 2017, in European Patent Application No. 15782738.7.
English translation of International Preliminary Report on Patentability for International Patent Application No. PCT/JP2015/062242, dated Nov. 3, 2016.
International Search Report for International Patent Application No. PCT/JP2015/062242, dated Aug. 4, 2015.
Office Action dated May 8, 2018, in Chinese Patent Application No. 201580033009.5.
Office Action dated Apr. 17, 2018, in Japanese Patent Application No. 2014-091861.
Office Action dated Feb. 20, 2018, in Japanese Patent Application No. 2014-091862.
Office Action dated Feb. 20, 2018, in Japanese Patent Application No. 2014-091863.

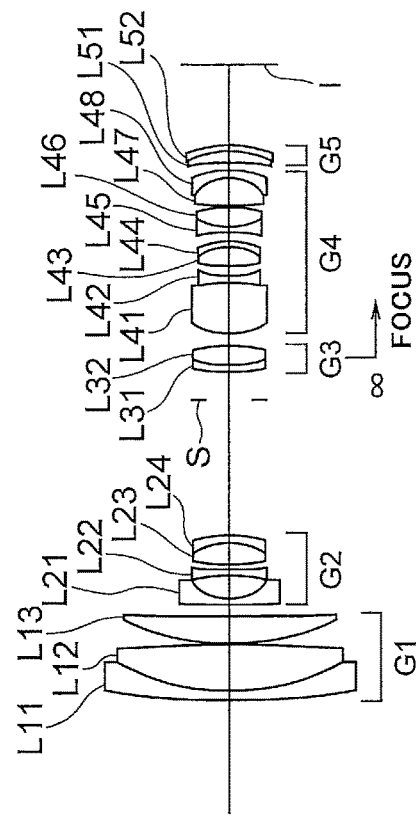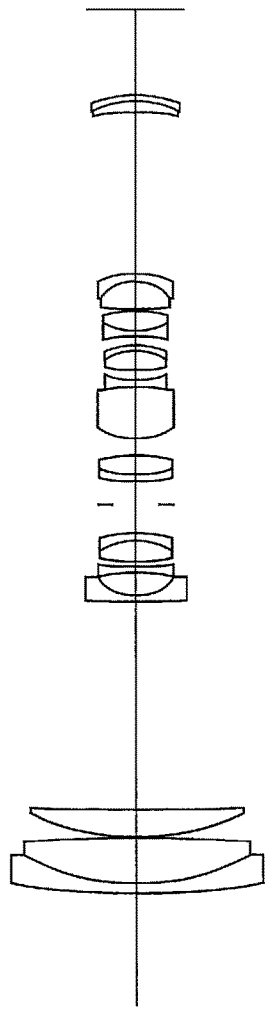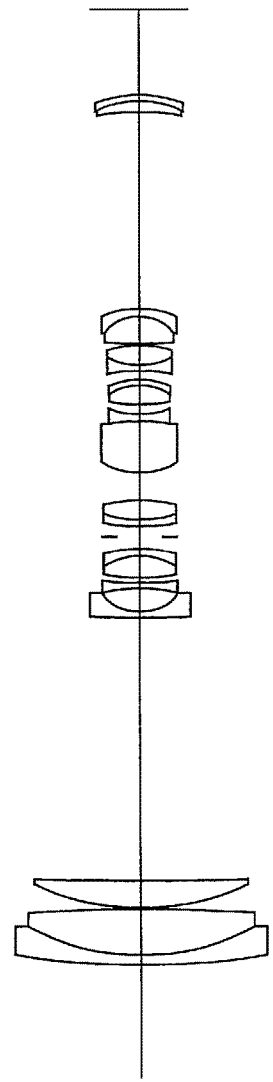
FIG.1A
FIG.1B
FIG.1C

VARIABLE POWER OPTICAL SYSTEM, OPTICAL DEVICE, AND METHOD OF MANUFACTURING VARIABLE POWER OPTICAL SYSTEM

TECHNICAL FIELD

The present invention relates to a variable power optical system, an optical device, and a method for manufacturing the variable power optical system.

BACKGROUND ART

There have been proposed, as a variable power optical system suitable for an interchangeable lens for cameras, a digital still camera, a video camera or the like, many variable power optical systems which comprise a most object side lens group having positive refractive power, among which variable power optical systems there has been proposed an optical system in which focusing from an infinitely distant object to a close object can be conducted by moving a portion of lens groups along the optical axis (for example, see Japanese Patent application Laid-Open No. 2009-251118).

PRIOR ART DOCUMENT

Patent Document

Patent Document 1: Japanese Patent application Laid-Open Gazette No. 2009-251118

SUMMARY OF THE INVENTION

Problem to be Solved by the Invention

However, in the conventional variable magnification optical system as described above, there was a problem that it was difficult to conduct downsizing while retaining a high variable magnification ratio and also attaining a sufficiently excellent optical performance upon focusing from an infinitely distant object to a close object.

Means for Solving the Problem

In order to solve the above-mentioned problems, according to a first aspect of the present invention, there is provided a variable magnification optical system comprising, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;

upon focusing, the third lens group being moved along the optical axis; and the following conditional expression being satisfied:

$$0.030 < (-f2)/ft < 0.120$$

where ft denotes a whole system focal length of the variable magnification optical system in the tele photo end state, and f2 denotes a focal length of the second lens group.

Further, according to a second aspect of the present invention, there is provided an optical apparatus equipped with the variable magnification optical system according to the first aspect of the present invention.

Further, according to a third aspect of the present invention, there is provided a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the second lens group to satisfy the conditional expression:

$$0.030 < (-f2)/ft < 0.120$$

where ft denotes a whole system focal length of the variable magnification optical system in the tele photo end state, and f2 denotes a focal length of the second lens group;

arranging such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane; and arranging the third lens group, upon focusing, to be moved along the optical axis.

According to a fourth aspect of the present invention, there is provided a variable magnification optical system comprising, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;

upon focusing, the third lens group being moved along the optical axis; and the following conditional expression being satisfied:

$$2.970 < f3/fw < 10.000$$

where fw denotes a whole system focal length of the variable magnification optical system in the wide angle end state, and f3 denotes a focal length of the third lens group.

Further, according to a fifth aspect of the present invention, there is provided an optical apparatus equipped with the variable magnification optical system according to the fourth aspect of the present invention.

Further, according to a sixth aspect of the present invention, there is provided a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the third lens group to satisfy the following conditional expression:

$$2.970 < f3/fw < 10.000$$

where fw denotes a whole system focal length of the variable magnification optical system in the wide angle end state, and f3 denotes a focal length of the third lens group;

arranging such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and arranging such that the third lens group, upon focusing, is moved along the optical axis.

According to a seventh aspect of the present invention, there is provided a variable magnification optical system comprising, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;

upon focusing, the third lens group being moved along the optical axis; and the following conditional expression being satisfied:

$$0.010 < (d4t-d4w)/f4 < 1.000$$

where d4t denotes a distance along the optical axis from a most image side lens surface of the fourth lens group to a most object side lens surface of the fifth lens group in the telephoto end state; d4w denotes a distance along the optical axis from the most image side lens surface of the fourth lens group to the most object side lens surface of the fifth lens group in the wide angle end state; and f4 denotes a focal length of the fourth lens group.

Further, according to an eighth aspect of the present invention, there is provided an optical apparatus equipped with the variable magnification optical system according to the seventh aspect of the present invention.

Further, according to a ninth aspect of the present invention, there is provided a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the fourth lens group and the fifth lens group to satisfy the following conditional expression:

$$0.010 < (d4t-d4w)/f4 < 1.000$$

where d4t denotes a distance on the the optical axis from a most image side lens surface of the fourth lens group to a most object side lens surface of the fifth lens group in the telephoto end state; d4w denotes a distance on the optical axis from the most image side lens surface of the fourth lens group to the most object side lens surface of the fifth lens group in the wide angle end state; and f4 denotes a focal length of the fourth lens group;

arranging such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and arranging such that the third lens group, upon focusing, is moved along the optical axis.

According to a tenth aspect of the present invention, there is provided a variable magnification optical system comprising, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;

upon focusing, the third lens group being moved along the optical axis; and the following conditional expression being satisfied:

$$0.010 < (d5it-d5iw)/(d3it-d3iw) < 1.000$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane.

Further, according to an eleventh aspect of the present invention, there is provided an optical apparatus equipped with the variable magnification optical system according to the tenth aspect of the present invention.

Further, according to a twelfth aspect of the present invention, there is provided a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the third lens group and the fourth lens group to satisfy the following conditional expression:

$$0.010 < (d5it-d5iw)/(d3it-d3iw) < 1.000$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from a most image side lens surface of the fifth lens group in the wide angle end state to the image plane;

arranging such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and arranging the third lens group, upon focusing, to be moved along the optical axis.

BRIEF DESCRIPTION OF THE DRAWINGS

FIGS. 1A, 1B and 1C are sectional views showing a variable magnification optical system according to a First Example common to the first to the fourth embodiments of the present application, in a wide-angle end state, in an intermediate focal length state and in a telephoto end state, respectively.

EMBODIMENTS FOR CARRYING OUT THE INVENTION

Figure 2A:
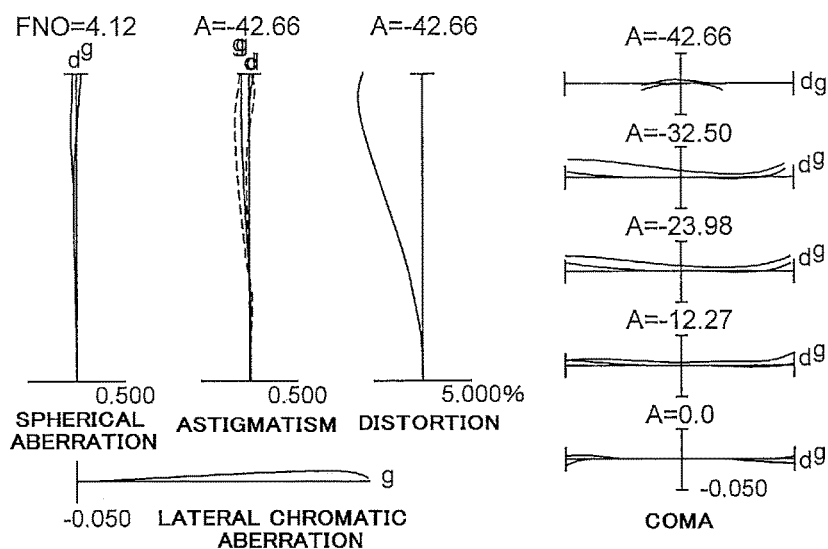
FIGS. 2A, 2B and 2C are graphs showing various aberrations of the variable magnification optical system according to the First Example of the present application upon focusing on an infinite distance object, in the wide-angle end state, in the intermediate focal length state, and in the telephoto end state, respectively.

A variable magnification optical system, an optical device and a method for manufacturing the variable magnification optical system, according to the first embodiment of the present application are explained below.

The variable magnification optical system according to the first embodiment of the present application comprises, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane. With this configuration, the variable magnification optical system according to the first embodiment of the present application can realize varying magnification from the wide angle end state to the telephoto end state and suppress respective variations in distortion, astigmatism and spherical aberration, associated with the varying magnification.

Further, the variable magnification optical system according to the first embodiment of the present application has a configuration that the third lens group is moved along the optical axis upon focusing. With this configuration, an amount of movement at the telephoto side upon focusing can be suppressed, and a whole length of the optical system in the entirety thereof can be suppressed, enabling downsizing. In addition, it becomes possible to suppress, at the telephoto side, variation in height of light rays from the optical axis, incident onto the third lens group which is the focusing lens group, and suppress variations in spherical aberration and astigmatism upon focusing.

Further, the variable magnification optical system according to the first embodiment of the present application satisfies the following conditional expression (1-1):

$$0.030<(-f2)/ft<0.120 \quad (1\text{-}1)$$

where ft denotes a whole system focal length of the variable magnification optical system in the tele photo end state, and f2 denotes a focal length of the second lens group.

The conditional expression (1-1) defines an adequate range of the focal length of the second lens group. With satisfying the conditional expression (1-1), the variable magnification optical system according to the first embodiment of the present application can suppress variations in spherical aberration and astigmatism upon varying magnification from a wide-angle end state to a telephoto end state.

When the value of $(-f2)/ft$ is equal to or falls below the lower limit value of the conditional expression (1-1), it becomes difficult to suppress variations in spherical aberration and astigmatism generated in the second lens group upon varying magnification, so that a high optical performance cannot be realized. Meanwhile, in order to attain the advantageous effect of the present application more surely, it is more preferable to set the lower limit value of the conditional expression (1-1) to 0.045.

On the other hand, in the variable magnification optical system according to the first embodiment of the present application, when the value of $(-f2)/ft$ is equal to or exceeds the upper limit value of the conditional expression (1-1), it becomes necessary to make amount of variation in distance between the first lens group and the second lens group upon varying magnification larger in order to attain a given variable magnification ratio. Therefore, it becomes not only difficult to downsize the system, but also diameter of on-axis light flux incident onto the second lens group from the first lens group changes largely in association with varying magnification. This causes that variation in spherical aberration upon varying magnification becomes excessive, so it becomes not possible to realize high optical performance. Meanwhile, in order to attain the advantageous effect of the present application more surely, it is more preferable to set the upper limit value of the conditional expression (1-1) to 0.095.

In the variable magnification optical system according to the first embodiment of the present application, it is preferable that, upon varying magnification from a wide-angle end state to a telephoto end state, the first lens group is moved toward the object side. With this configuration, change in height from the optical axis of off-axis light flux passing through the first lens group upon varying magnification can be suppressed, so diameter of the first lens group can be made small and variation in astigmatism upon varying magnification can be suppressed.

Further, it is preferable that the variable magnification optical system according to the first embodiment of the present application satisfies the following conditional expression (1-2):

$$2.970<f3/fw<10.000 \quad (1\text{-}2)$$

where fw denotes a whole system focal length of the variable magnification optical system in the wide angle end state, and f3 denotes a focal length of the third lens group.

The conditional expression (1-2) defines an adequate range of the focal length of the third lens group. With satisfying the conditional expression (1-2), the variable magnification optical system according to the first embodiment of the present application can suppress variations in spherical aberration and astigmatism upon varying magnification from a wide-angle end state to a telephoto end state, and upon focusing from an infinitely distant object to a close distance object.

When the value of f3/fw is equal to or falls below the lower limit value of the conditional expression (1-2), it becomes difficult to suppress variations in spherical aberration and astigmatism generated in the third lens group upon varying magnification as well as upon focusing, so that a high optical performance cannot be realized. Meanwhile, in order to attain the advantageous effect of the present application more surely, it is more preferable to set the lower limit value of the conditional expression (1-2) to 3.300.

On the other hand, when the value of f3/fw is equal to or exceeds the upper limit value of the conditional expression (1-2), an amount of movement of the third lens group upon focusing from an infinitely distant object to a close distance object becomes large. Thereby, height from the optical axis of off-axis light flux and on-axis light flux incident on the third lens group upon focusing, vary largely, so variations in spherical aberration and in astigmatism become large and it becomes not possible to realize high optical performance. Meanwhile, in order to attain the advantageous effect of the present application more surely, it is more preferable to set the upper limit value of the conditional expression (1-2) to 7.000.

Further, it is preferable that the variable magnification optical system according to the first embodiment of the present application satisfies the following conditional expression (1-3):

$$0.010<(d4t-d4w)/f4<1.000 \quad (1\text{-}3)$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide angle end state; and f4 denotes a focal length of the fourth lens group.

The conditional expression (1-3) defines an adequate range of change in a distance on the optical axis from the most image side lens surface of the fourth lens group to the most object side lens surface of the fifth lens group at the time when magnification is varied from the wide angle end state to the telephoto end state. With satisfying the conditional expression (1-3), the variable magnification optical system according to the first embodiment of the present application can suppress variations in astigmatism and distortion upon varying magnification from the wide-angle end state to the telephoto end state.

When the value of (d4t−d4w)/f4 is equal to or falls below the lower limit value of the conditional expression (1-3), it becomes difficult for the fifth lens group to suppress variations in astigmatism and distortion generated in the fourth lens group upon varying magnification, so that a high optical performance cannot be realized. Meanwhile, in order to attain the advantageous effect of the present application more surely, it is more preferable to set the lower limit value of the conditional expression (1-3) to 0.200.

On the other hand, when the value of (d4t−d4w)/f4 is equal to or exceeds the upper limit value of the conditional expression (1-3), height of off-axis light flux from the optical axis, incident on the fifth lens group from the fourth lens group, varies largely in association with varying magnification. Therefore, variations in astigmatism and distortion generated in the fifth lens group upon varying magnification become excessive, and it becomes impossible to realized high optical performance. Further, since height of off-axis light flux from the optical axis in the fifth lens group increases, outer diameter of the fifth lens group becomes large. Meanwhile, in order to attain the advantageous effect of the present application more surely, it is more preferable to set the upper limit value of the conditional expression (1-3) to 0.800.

Further, it is preferable that the variable magnification optical system according to the first embodiment of the present application satisfies the following conditional expression (1-4):

$$0.010 < (d5it - d5iw)/(d3it - d3iw) < 1.000 \quad (1\text{-}4)$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane.

The conditional expression (1-4) defines an adequate range of a ratio of a change in a distance on the optical axis from the most image side lens surface of the third lens group to the image plane to a change in a distance on the optical axis from the most image side lens surface of the fifth lens group to the image plane, at the time when magnification is varied from the wide angle end state to the telephoto end state. With satisfying the conditional expression (1-4), the variable magnification optical system according to the first embodiment of the present application can suppress variations in astigmatism and distortion upon varying magnification from the wide-angle end state to the telephoto end state.

When the value of (d5it−d5iw)/(d3it−d3iw) is equal to or falls below the lower limit value of the conditional expression (1-4), height of off-axis light flux from the optical axis incident onto the fifth lens group from the fourth lens group varies largely in accordance with varying magnification, so variations in astigmatism as well as distortion generated in the fifth lens group upon varying magnification become excessive and it becomes impossible to realize high optical performance. Further, height of off-axis light flux from the optical axis incident onto the fifth lens group become large, so that diameter of the fifth lens group becomes large. Meanwhile, in order to attain the advantageous effect of the present application more surely, it is more preferable to set the lower limit value of the conditional expression (1-4) to 0.020.

On the other hand, when the value of (d5it−d5iw)/(d3it−d3iw) is equal to or exceeds the upper limit value of the conditional expression (1-4), it becomes difficult to suppress variation in astigmatism generated at the third lens group by the fifth lens group, so that high optical performance cannot be realized. Meanwhile, in order to attain the advantageous effect of the present application more surely, it is more preferable to set the upper limit value of the conditional expression (1-4) to 0.700.

Meanwhile, in order to realize high magnification variation, the distance along the optical axis from a most image side lens surface of the third lens group to the image plane upon varying magnification from the wide angle end state to the telephoto end state becomes large, this means that (d3it−d3iw) in the conditional expression (1-4) is preferably positive. If so, it is possible to suppress variation in astigmatism generated at the third lens group.

Further, it is desirable that the variable magnification optical system according to the first embodiment of the present application has an aperture stop, and a distance between the aperture stop and the fourth lens group is not varied upon varying magnification from the wide angle end state to the telephoto end state. With this configuration, it is possible to suppress variation in height of off-axis light flux from the optical axis incident onto the fourth lens group, so variations in astigmatism and distortion upon varying magnification from the wide angle end state to the telephoto end state can be suppressed.

Further, it is desirable that, in the variable magnification optical system according to the first embodiment of the present application, the third lens group is moved to the image side, upon focusing from an infinitely distant object to a close distance object. The variable magnification optical system according to the first embodiment of the present application can carry out focusing effectively from the infinitely distant object to the close distance object, by moving the third lens group to the image side upon focusing, and variations in spherical aberration and astigmatism can be suppressed.

Further, it is desirable that, in the variable magnification optical system according to the first embodiment of the present application, a distance between the first lens group and the second lens group increases upon varying magnification from the wide angle end state to the telephoto end state. With this configuration, it is possible to increase magnification of the second lens group, so that it is possible to realize high variable magnification ratio effectively and to suppress variations in spherical aberration and astigmatism upon varying magnification.

Further, it is desirable that, in the variable magnification optical system according to the first embodiment of the present application, a distance between the second lens group and the third lens group decreases upon varying magnification from the wide angle end state to the telephoto end state. With this configuration, a composite magnification from the third lens group to the fifth lens group can be increased, so that it is possible to realize high variable magnification ratio effectively and to suppress variations in spherical aberration and astigmatism upon varying magnification.

Further, it is desirable that, in the variable magnification optical system according to the first embodiment of the present application, the fifth lens group has positive refractive power. With this configuration, a use magnification of the fifth lens group becomes smaller than an equi-magnification so that it is possible to make a composite focal length of the first to the fourth lens groups relatively larger. As a result, influence onto eccentric coma aberration caused by eccentricity among lenses in the first to the fourth lens groups upon assembling can be suppressed small relatively, and high optical performance can be realized.

An optical apparatus of the present application is equipped with a variable magnification optical system according to the first embodiment of the present application. Thus, an optical apparatus having a high variable magnification ratio, a small size, and a high optical performance can be realized.

The method for manufacturing a variable magnification optical system according to the first embodiment of the present application, is a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the second lens group to satisfy the conditional expression (1-1):

$$0.030<(-f2)/ft<0.120 \qquad (1\text{-}1)$$

where ft denotes a whole system focal length of the variable magnification optical system in the tele photo end state, and f2 denotes a focal length of the second lens group;

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and arranging the third lens group to be moved along the optical axis, upon focusing.

With this method, it is possible to manufacture a variable magnification optical system having a high variable magnification ratio, a small size, and a high optical performance upon focusing from an infinitely distant object to a close distance object.

A variable magnification optical system, an optical apparatus and a method for manufacturing the variable magnification optical system, according to the second embodiment of the present application are explained below.

The variable magnification optical system according to the second embodiment of the present application comprises, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane. With this configuration, the variable magnification optical system according to the second embodiment of the present application can realize varying magnification from the wide angle end state to the telephoto end state and suppress respective variations in distortion, astigmatism and spherical aberration, associated with varying magnification.

Further, the variable magnification optical system according to the second embodiment of the present application has a configuration that the third lens group is moved along the optical axis upon focusing. With this configuration, an amount of movement at the telephoto side upon focusing can be suppressed, and a whole length of the optical system in the entirety thereof can be suppressed, enabling downsizing. In addition, it becomes possible to suppress, at the telephoto side, variation in height of light rays, from the optical axis, incident onto the third lens group that is the focusing lens group, and suppress variations in spherical aberration and astigmatism upon focusing.

Further, it is preferable that the variable magnification optical system according to the second embodiment of the present application satisfies the following conditional expression (2-1):

$$2.970<f3/fw<10.000 \qquad (2\text{-}1)$$

where fw denotes a whole system focal length of the variable magnification optical system in the wide angle end state, and f3 denotes a focal length of the third lens group.

The conditional expression (2-1) defines an adequate range of the focal length of the third lens group. With satisfying the conditional expression (2-1), the variable magnification optical system according to the second embodiment of the present application can suppress variations in spherical aberration and astigmatism upon varying magnification from a wide-angle end state to a telephoto end state, and upon focusing from an infinitely distant object to a close distance object.

When the value of f3/fw is equal to or falls below the lower limit value of the conditional expression (2-1), it becomes difficult to suppress variations in spherical aberration and astigmatism generated in the third lens group upon varying magnification as well as upon focusing, so that a high optical performance cannot be realized. Meanwhile, in order to attain the advantageous effect of the present application more surely, it is more preferable to set the lower limit value of the conditional expression (2-1) to 3.300.

On the other hand, when the value of f3/fw is equal to or exceeds the upper limit value of the conditional expression (2-1), an amount of movement of the third lens group upon focusing from an infinitely distant object to a close distance object becomes large. Thereby, height from the optical axis of off-axis light flux and on-axis light flux incident on the third lens group upon focusing, vary largely, so variations in spherical aberration and in astigmatism become large and it becomes not possible to realize high optical performance. Meanwhile, in order to attain the advantageous effect of the present application more surely, it is more preferable to set the upper limit value of the conditional expression (2-1) to 7.000.

Further, in the variable magnification optical system according to the second embodiment of the present application, it is desirable that the first lens group is moved toward the object side upon varying magnification from the wide angle end state to the telephoto end state. With this configuration, it is possible to suppress variation in height of off-axis light flux from the optical axis passing through the first lens group upon varying magnification, so that diameter of the first lens group can be made small and in addition variation in astigmatism upon varying magnification can be suppressed.

Further, it is desirable that the variable magnification optical system according to the second embodiment of the present application satisfies the following conditional expression (2-2):

$$2.700 < (d1it-d1iw)/fw < 10.000 \quad (2\text{-}2)$$

where fw denotes a whole system focal length of the variable magnification optical system in the wide angle end state, d1it denotes a distance on the optical axis from a most image side lens surface of the first lens group in the telephoto end state to the image plane, and d1iw denotes a distance on the optical axis from the most image side surface of the first lens group in the wide angle end state to the image plane.

The conditional expression (2-2) defines an adequate range of change in a distance on the optical axis from the most image side lens surface of the first lens group to the image plane at the time when magnification is varied from a wide angle end state to a telephoto end state. With satisfying the conditional expression (2-2), the variable magnification optical system according to the second embodiment of the present application can suppress variations in spherical aberration and astigmatism upon varying magnification from the wide-angle end state to the telephoto end state.

When the value of (d1it−d1iw)/fw is equal to or falls below the lower limit value of the conditional expression (2-2), it becomes difficult to suppress variation in astigmatism generated at the first lens group upon varying magnification, so it becomes impossible to realize high optical performance. Meanwhile, in order to attain the advantageous effect of the present application more surely, it is more preferable to set the lower limit value of the conditional expression (2-2) to 3.900.

On the other hand, when the value of (d1it−d1iw)/fw is equal to or exceeds the upper limit value of the conditional expression (2-2), diameter of on-axis light flux incident onto the second lens group from the first lens group varies largely in accordance with varying magnification. Thus, variation in spherical aberration upon varying magnification becomes excessive, so that high optical performance cannot be realized. Meanwhile, in order to attain the advantageous effect of the present application more surely, it is more preferable to set the upper limit value of the conditional expression (2-2) to 7.800.

Further, it is preferable that the variable magnification optical system according to the second embodiment of the present application satisfies the following conditional expression (2-3):

$$0.010 < (d5it-d5iw)/(d3it-d3iw) < 1.000 \quad (2\text{-}3)$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane.

The conditional expression (2-3) defines an adequate range of a ratio of a change in a distance on the optical axis from the most image side lens surface of the third lens group to the image plane to a change in a distance on the optical axis from the most image side lens surface of the fifth lens group to the image plane, at the time when magnification is varied from a wide angle end state to a telephoto end state. With satisfying the conditional expression (2-3), the variable magnification optical system according to the second embodiment of the present application can suppress variations in astigmatism and distortion upon varying magnification from a wide-angle end state to a telephoto end state.

When the value of (d5it−d5iw)/(d3it−d3iw) is equal to or falls below the lower limit value of the conditional expression (2-3), height of off-axis light flux from the optical axis incident onto the fifth lens group from the fourth lens group varies largely in accordance with varying magnification. Accordingly, variations in astigmatism and distortion generated at the fifth lens group upon varying magnification, become excessive, so it becomes impossible to realize high optical performance. Moreover, height of the off-axis light flux from the optical axis incident on the fifth lens group becomes large so that diameter of the fifth lens group becomes large. Meanwhile, in order to attain the advantageous effect of the present application more surely, it is more preferable to set the lower limit value of the conditional expression (2-3) to 0.020.

On the other hand, when the value of (d5it−d5iw)/(d3it−d3iw) is equal to or exceeds the upper limit value of the conditional expression (2-3), it becomes difficult for the fifth lens group to suppress variation in astigmatism generated at the third lens group upon varying magnification, so it becomes difficult to realize high optical performance. Meanwhile, in order to attain the advantageous effect of the present application more surely, it is more preferable to set the upper limit value of the conditional expression (2-3) to 0.700.

Meanwhile, in order to realize high magnification variation, the distance along the optical axis from a most image side lens surface of the third lens group to the image plane upon varying magnification from the wide angle end state to the telephoto end state becomes large, this means that (d3it−d3iw) in the conditional expression (2-3) is preferably positive. If so, it is possible to suppress variation in astigmatism generated at the third lens group.

Further, it is preferable that the variable magnification optical system according to the second embodiment of the present application satisfies the following conditional expression (2-4):

$$0.300 < f3/f4 < 1.500 \quad (2\text{-}4)$$

where f3 denotes a focal length of the third lens group, and f4 denotes a focal length of the fourth lens group.

The conditional expression (2-4) defines an adequate range of the focal length ratio of the third lens group and the fourth lens group. With satisfying the conditional expression (2-4), the variable magnification optical system according to the second embodiment of the present application can suppress variations in spherical aberration and astigmatism upon varying magnification from a wide-angle end state to a telephoto end state.

When the value of f3/f4 of the conditional expression (2-4) is equal to or falls below the lower limit value of the conditional expression (2-4), it becomes difficult to suppress variations in spherical aberration and astigmatism generated at the third lens group upon varying magnification, so that a high optical performance cannot be realized. Meanwhile, in order to attain the advantageous effect of the present application more surely, it is more preferable to set the lower limit value of the conditional expression (2-4) to 0.600.

On the other hand, when the value of f3/f4 is equal to or exceeds the upper limit value of the conditional expression (2-4), it becomes difficult to suppress variations in spherical aberration and astigmatism generated at the fourth lens group upon varying magnification, and it becomes impossible to realize high optical performance. Meanwhile, in order to attain the advantageous effect of the present application more surely, it is more preferable to set the upper limit value of the conditional expression (2-4) to 1.250.

Further, it is desirable that the variable magnification optical system according to the second embodiment of the present application has an aperture stop and a distance between the aperture stop and the fourth lens group is not varied upon varying magnification from the wide angle end state to the telephoto end state. With this configuration, it is possible to suppress variation in height of off-axis light flux from the optical axis incident onto the fourth lens group upon varying magnification from the wide angle end state to the telephoto end state, so variations in astigmatism and distortion upon varying magnification can be suppressed.

Further, it is desirable that, in the variable magnification optical system according to the second embodiment of the present application, the third lens group is moved to the image side, upon focusing from an infinitely distant object to a close distance object. The variable magnification optical system according to the second embodiment of the present application, can carry out focusing effectively from the infinitely distant object to the close distance object, by moving the third lens group to the image side upon focusing, and variations in spherical aberration and astigmatism can be suppressed.

Further, it is desirable that, in the variable magnification optical system according to the second embodiment of the present application, a distance between the first lens group and the second lens group increases upon varying magnification from the wide angle end state to the telephoto end state. With this configuration, it is possible to increase magnification of the second lens group, so that it is possible to realize high variable magnification ratio effectively and to suppress variations in spherical aberration and astigmatism upon varying magnification.

Further, it is desirable that, in the variable magnification optical system according to the second embodiment of the present application, a distance between the second lens group and the third lens group decreases upon varying magnification from the wide angle end state to the telephoto end state. With this configuration, it is possible to increase a composite magnification from the third lens group to the fifth lens group, so that it is possible to realize high variable magnification ratio effectively and to suppress variations in spherical aberration and astigmatism upon varying magnification.

Further, it is desirable that, in the variable magnification optical system according to the second embodiment of the present application, the fifth lens group has positive refractive power. With this configuration, a use magnification of the fifth lens group becomes smaller than an equi-magnification so that it is possible to make a composite focal length of the first to the fourth lens groups relatively larger. As a result, influence such as eccentric coma aberration caused by eccentricity among lenses generated in the first to the fourth lens groups upon assembling can be suppressed small relatively, and high optical performance can be realized.

An optical apparatus of the present application is equipped with a variable magnification optical system according to the second embodiment of the present application. Thus, an optical apparatus having a high variable magnification ratio, a small size, and a high optical performance can be realized.

The method for manufacturing a variable magnification optical system according to the second embodiment of the present application, is a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

arranging the third lens group to satisfy the following conditional expression (2-1):

$$2.970 < f3/fw < 10.000 \qquad (2\text{-}1)$$

where fw denotes a whole system focal length of the variable magnification optical system in the wide angle end state, and f3 denotes a focal length of the third lens group;

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane; and arranging the third lens group to be moved along the optical axis, upon focusing.

With this method, it is possible to manufacture a variable magnification optical system having a high variable magnification ratio, a small size, and a high optical performance upon focusing from an infinitely distant object to a closely distant object.

A variable magnification optical system, an optical apparatus and a method for manufacturing the variable magnification optical system, according to the third embodiment of the present application are explained below.

The variable magnification optical system according to the third embodiment of the present application comprises, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane. With this configuration, the variable magnification optical system according to the third embodiment of the present application can realize varying magnification from the wide angle end state to the telephoto end state and suppress respective variations in distortion, astigmatism and spherical aberration, associated with varying magnification.

Further, the variable magnification optical system according to the third embodiment of the present application has a configuration that the third lens group is moved along the optical axis upon focusing. With this configuration, an amount of the movement at the telephoto side upon focusing can be suppressed, and a whole length of the optical system in the entirety thereof can be suppressed, enabling downsizing. In addition, it becomes possible to suppress, at the telephoto side, variation in height of light rays, from the optical axis, incident onto the third lens group that is focusing lens group, and suppress variations in spherical aberration and astigmatism upon focusing.

Further, the variable magnification optical system according to the third embodiment of the present application satisfies the following conditional expression (3-1):

$$0.010 < (d4t - d4w)/f4 < 1.000 \quad (3\text{-}1)$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide angle end state; and f4 denotes a focal length of the fourth lens group.

The conditional expression (3-1) defines an adequate range of change in a distance on the optical axis from the most image side lens surface of the fourth lens group to the most object side lens surface of the fifth lens group at the time when magnification is varied from a wide angle end state to a telephoto end state. With satisfying the conditional expression (3-1), the variable magnification optical system according to the third embodiment of the present application can suppress variations in astigmatism and distortion upon varying magnification from the wide-angle end state to the telephoto end state.

When the value of (d4t−d4w)/f4 is equal to or falls below the lower limit value of the conditional expression (3-1), it becomes difficult for the fifth lens group to suppress variations in astigmatism and distortion generated at the fourth lens group upon varying magnification, so that a high optical performance cannot be realized. Meanwhile, in order to attain the advantageous effect of the present application more surely, it is more preferable to set the lower limit value of the conditional expression (3-1) to 0.200.

On the other hand, when the value of (d4t−d4w)/f4 is equal to or exceeds the upper limit value of the conditional expression (3-1), height of off-axis light flux from the optical axis, incident on the fifth lens group from the fourth lens group, varies largely in association with varying magnification. Therefore, variations in astigmatism and distortion generated at the fifth lens group upon varying magnification become excessive, so high optical performance cannot become realized. Moreover, since height of off-axis light flux from the optical axis in the fifth lens group increases, so outer diameter of the fifth lens group becomes large.

Meanwhile, in order to attain the advantageous effect of the present application more surely, it is more preferable to set the upper limit value of the conditional expression (3-1) to 0.800.

Further, it is desirable that, in the variable magnification optical system according to the third embodiment of the present application, the first lens group is moved along the optical axis toward the object side upon varying magnification from the wide angle end state to the telephoto end state. With this configuration, change in height from the optical axis, of off-axis light flux passing through the first lens group upon varying magnification, can be suppressed, so diameter of the first lens group can be made small and variation in astigmatism upon varying magnification can be suppressed.

Further, it is preferable that the variable magnification optical system according to the third embodiment of the present application satisfies the following conditional expression (3-2):

$$2.970 < f3/fw < 10.000 \quad (3\text{-}2)$$

where fw denotes a whole system focal length of the variable magnification optical system in the wide angle end state, and f3 denotes a focal length of the third lens group.

The conditional expression (3-2) defines an adequate range of the focal length of the third lens group. With satisfying the conditional expression (3-2), the variable magnification optical system according to the third embodiment of the present application can suppress variations in spherical aberration and astigmatism upon varying magnification from the wide-angle end state to the telephoto end state, and upon focusing from an infinitely distant object to a close distance object.

When the value of f3/fw is equal to or falls below the lower limit value of the conditional expression (3-2), it becomes difficult to suppress variations in spherical aberration and astigmatism generated at the third lens group upon varying magnification as well as upon focusing, so that a high optical performance cannot be realized. Meanwhile, in order to attain the advantageous effect of the present application more surely, it is more preferable to set the lower limit value of the conditional expression (3-2) to 3.300.

On the other hand, when the value of f3/fw is equal to or exceeds the upper limit value of the conditional expression (3-2), an amount of movement of the third lens group upon focusing from an infinitely distant object to a close distance object becomes large. Thereby, height from the optical axis of off-axis light flux and on-axis light flux incident on the third lens group upon focusing, vary largely, so variations in spherical aberration and in astigmatism become large and it becomes not possible to realize high optical performance. Meanwhile, in order to attain the advantageous effect of the present application more surely, it is more preferable to set the upper limit value of the conditional expression (3-2) to 7.000.

Further, it is desirable that the variable magnification optical system according to the third embodiment of the present application satisfies the following conditional expression (3-3):

$$2.700 < (d1it - d1iw)/fw < 10.000 \quad (3\text{-}3)$$

where fw denotes a whole system focal length of the variable magnification optical system in the wide angle end state, d1it denotes a distance on the optical axis from a most image side surface of the first lens group in the tele photo end state to the image plane, and d1iw denotes a distance on the optical axis from the most image side surface of the first lens group in the telephoto end state to the image plane.

The conditional expression (3-3) defines an adequate range of change in a distance on the optical axis from the most image side lens surface of the first lens group to the image plane at the time when magnification is varied from a wide angle end state to a telephoto end state. With satisfying the conditional expression (3-3), the variable magnification optical system according to the third embodiment of the present application can suppress variations in spherical aberration and astigmatism upon varying magnification from the wide-angle end state to the telephoto end state.

When the value of (d1it−d1iw)/fw is equal to or falls below the lower limit value of the conditional expression (3-3), it becomes difficult to suppress variation in astigmatism generated at the first lens group upon varying magnification, so it becomes impossible to realize high optical performance. Meanwhile, in order to attain the advantageous effect of the present application more surely, it is more preferable to set the lower limit value of the conditional expression (3-3) to 3.900.

On the other hand, when the value of (d1it−d1iw)/fw is equal to or exceeds the upper limit value of the conditional expression (3-3), diameter of on-axis light flux incident onto the second lens group from the first lens group varies largely in association with varying magnification. Thus, variation in spherical aberration upon varying magnification becomes excessive, so that high optical performance cannot be realized. Meanwhile, in order to attain the advantageous effect of the present application more surely, it is more preferable to set the upper limit value of the conditional expression (3-3) to 7.800.

Further, it is desirable that the variable magnification optical system according to the third embodiment of the present application satisfies the following conditional expression (3-4):

$$0.010 < f3/ft < 0.650 \tag{3-4}$$

where ft denotes a whole system focal length of the variable magnification optical system in the telephoto end state, and f3 denotes a focal length of the third lens group.

The conditional expression (3-4) defines an adequate range of the focal length of the third lens group. With satisfying the conditional expression (3-4), the variable magnification optical system according to the third embodiment of the present application can suppress variations in spherical aberration and astigmatism upon varying magnification from the wide-angle end state to the telephoto end state and upon focusing from an infinitely distant object to a closely distant object.

When the value of f3/ft is equal to or falls below the lower limit value of the conditional expression (3-4), it becomes difficult to suppress variations in spherical aberration and astigmatism generated at the third lens group upon varying magnification as well as upon focusing, so that a high optical performance cannot be realized. Meanwhile, in order to attain the advantageous effect of the present application more surely, it is more preferable to set the lower limit value of the conditional expression (3-4) to 0.130.

On the other hand, when the value of f3/ft is equal to or exceeds the upper limit value of the conditional expression (3-4), an amount of movement of the third lens group upon focusing from an infinitely distant object to a close distance object becomes large. Thereby, height from the optical axis of off-axis light flux and on-axis light flux incident on the third lens group upon focusing, vary largely, so variations in spherical aberration and in astigmatism become large and it becomes not possible to realize high optical performance.

Meanwhile, in order to attain the advantageous effect of the present application more surely, it is more preferable to set the upper limit value of the conditional expression (3-4) to 0.470.

Further, it is desirable that the variable magnification optical system according to the third embodiment of the present application has an aperture stop, and a distance between the aperture stop and the fourth lens group is not varied upon varying magnification from the wide angle end state to the telephoto end state. With this configuration, it is possible to suppress variation in height of off-axis light flux from the optical axis incident onto the fourth lens group upon varying magnification from the wide angle end state to the telephoto end state, so variations in astigmatism and distortion upon varying magnification can be suppressed.

Further, it is desirable that the variable magnification optical system according to the third embodiment of the present application has an aperture stop and the aperture stop is disposed along the optical axis between the second lens group and the third lens group.

With this configuration, it is possible to suppress variation in height of on-axis light flux from the optical axis incident onto the third lens group upon varying magnification from the wide angle end state to the telephoto end state, so variations in spherical aberration upon varying magnification can be suppressed.

Further, it is desirable that, in the variable magnification optical system according to the third embodiment of the present application, the third lens group is moved toward the image side, upon focusing from an infinitely distant object to a close distance object. The variable magnification optical system according to the third embodiment of the present application, can carry out focusing effectively from the infinitely distant object to the close distance object, by moving the third lens group toward the image side upon focusing, and variations in spherical aberration and astigmatism can be suppressed.

Further, it is desirable that, in the variable magnification optical system according to the third embodiment of the present application, a distance between the first lens group and the second lens group increases upon varying magnification from the wide angle end state to the telephoto end state. With this configuration, it is possible to increase magnification of the second lens group, so that it is possible to realize high variable magnification ratio effectively and to suppress variations in spherical aberration and astigmatism upon varying magnification.

Further, it is desirable that, in the variable magnification optical system according to the third embodiment of the present application, a distance between the second lens group and the third lens group decreases upon varying magnification from the wide angle end state to the telephoto end state. With this configuration, it is possible to increase a composite magnification of the third to the fifth lens groups, so that it is possible to realize high variable magnification ratio effectively and to suppress variations in spherical aberration and astigmatism upon varying magnification.

Further, it is desirable that, in the variable magnification optical system according to the third embodiment of the present application, the fifth lens group has positive refractive power. With this configuration, a use magnification of the fifth lens group becomes smaller than an equi-magnification so that it is possible to make a composite focal length of the first to the fourth lens groups relatively larger. As a result, influence such as eccentric coma aberration caused by eccentricity among lenses in the first to the fourth lens groups upon assembling can be suppressed small relatively, and high optical performance can be realized.

An optical apparatus of the present application is equipped with a variable magnification optical system according to the third embodiment of the present application. Thus, an optical apparatus having a high variable magnification ratio, a small size, and a high optical performance can be realized.

The method for manufacturing a variable magnification optical system according to the third embodiment of the present application, is a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

constructing the fourth lens group and the fifth lens group to satisfy the following conditional expression (3-1):

$$0.010<(d4t-d4w)/f4<1.000 \qquad (3\text{-}1)$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide angle end state; and f4 denotes a focal length of the fourth lens group;

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and constructing the third lens group to be moved along the optical axis, upon focusing.

With this method, it is possible to manufacture a variable magnification optical system having a high variable magnification ratio, a small size, and a high optical performance upon focusing from an infinitely distant object to a closely distant object.

A variable magnification optical system, an optical apparatus and a method for manufacturing the variable magnification optical system, according to the fourth embodiment of the present application are explained below.

The variable magnification optical system according to the fourth embodiment of the present application comprises, in order from an object side along the optical axis: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane. With this configuration, the variable magnification optical system according to the fourth embodiment of the present application can realize varying magnification from the wide angle end state to the telephoto end state and suppress respective variations in distortion, astigmatism and spherical aberration, associated with varying magnification.

Further, the variable magnification optical system according to the fourth embodiment of the present application has a configuration that the third lens group is moved along the optical axis upon focusing. With this configuration, an amount of movement at the telephoto side upon focusing can be suppressed, and a whole length of the optical system in the entirety thereof can be suppressed, enabling downsizing. In addition, it becomes possible to suppress, at the telephoto side, variation in height of light rays from the optical axis, incident onto the third lens group that is focusing lens group, and to suppress variations in spherical aberration and astigmatism upon focusing.

Further, the variable magnification optical system according to the fourth embodiment of the present application satisfies the following conditional expression (4-1):

$$0.010<(d5it-d5iw)/(d3it-d3iw)<1.000 \qquad (4\text{-}1)$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane.

The conditional expression (4-1) defines an adequate range of a ratio of a change in a distance on the optical axis from the most image side lens surface of the third lens group to the image plane to a change in a distance on the optical axis from the most image side lens surface of the fifth lens group to the image plane, at the time when magnification is varied from a wide angle end state to a telephoto end state. With satisfying the conditional expression (4-1), the variable magnification optical system according to the fourth embodiment of the present application can suppress variations in astigmatism and distortion upon varying magnification from a wide-angle end state to a telephoto end state.

When the value of (d5it−d5iw)/(d3it−d3iw) is equal to or falls below the lower limit value of the conditional expression (4-1), height of off-axis light flux from the optical axis incident onto the fifth lens group from the fourth lens group varies largely in association with varying magnification. Accordingly, variations in astigmatism and distortion generated at the fifth lens group upon varying magnification, become excessive, so it becomes impossible to realize high optical performance. Moreover, height of the off-axis light flux from the optical axis incident on the fifth lens group becomes large so that diameter of the fifth lens group becomes large. Meanwhile, in order to attain the advantageous effect of the present application more surely, it is more preferable to set the lower limit value of the conditional expression (4-1) to 0.020.

On the other hand, when the value of (d5it−d5iw)/(d3it−d3iw) is equal to or exceeds the upper limit value of the conditional expression (4-1), it becomes difficult for the fifth lens group to suppress variation in astigmatism generated at the third lens group upon varying magnification, so it becomes difficult to realize high optical performance. Meanwhile, in order to attain the advantageous effect of the present application more surely, it is more preferable to set the upper limit value of the conditional expression (4-1) to 0.700.

Meanwhile, in order to realize high magnification variation, the distance along the optical axis from the most image side lens surface of the third lens group to the image plane upon varying magnification from the wide angle end state to the telephoto end state becomes large, this means that (d3it−d3iw) in the conditional expression (4-1) is preferably positive. If so, it is possible to suppress variation in astigmatism generated at the third lens group.

Further, it is desirable that, in the variable magnification optical system according to the fourth embodiment of the present application, the first lens group is moved toward the object side upon varying magnification from the wide angle end state to the telephoto end state. With this configuration, change in height from the optical axis, of off-axis light flux passing through the first lens group upon varying magnification, can be suppressed, so diameter of the first lens group can be made small and variation in astigmatism upon varying magnification can be suppressed.

Further, it is desirable that the variable magnification optical system according to the fourth embodiment of the present application satisfies the following conditional expression (4-2):

$$0.010<(d4t-d4w)/f4<1.000 \quad (4-2)$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide angle end state; and f4 denotes a focal length of the fourth lens group.

The conditional expression (4-2) defines an adequate range of change in a distance on the optical axis from the most image side lens surface of the fourth lens group to the most object side lens surface of the fifth lens group at the time when magnification is varied from a wide angle end state to a telephoto end state. With satisfying the conditional expression (4-2), the variable magnification optical system according to the fourth embodiment of the present application can suppress variations in astigmatism and distortion upon varying magnification from a wide-angle end state to a telephoto end state.

When the value of (d4t−d4w)/f4 is equal to or falls below the lower limit value of the conditional expression (4-2), it becomes difficult for the fifth lens group to suppress variations in spherical aberration and distortion generated at the fourth lens group upon varying magnification, so that a high optical performance cannot be realized. Meanwhile, in order to attain the advantageous effect of the present application more surely, it is more preferable to set the lower limit value of the conditional expression (4-2) to 0.200.

On the other hand, when the value of (d4t−d4w)/f4 is equal to or exceeds the upper limit value of the conditional expression (4-2), height of off-axis light flux from the optical axis, incident on the fifth lens group from the fourth lens group, varies largely in association with varying magnification. Therefore, variations in astigmatism and distortion generated at the fifth lens group upon varying magnification become excessive, so high optical performance cannot become realized. Moreover, since height of off-axis light flux from the optical axis in the fifth lens group increases, outer diameter of the fifth lens group becomes large. Meanwhile, in order to attain the advantageous effect of the present application more surely, it is more preferable to set the upper limit value of the conditional expression (4-2) to 0.800.

Further, it is desirable that the variable magnification optical system according to the fourth embodiment of the present application satisfies the following conditional expression (4-3):

$$0.030<(-f2)/ft<0.120 \quad (4-3)$$

where ft denotes a whole system focal length of the variable magnification optical system in the telephoto end state, and f2 denotes a focal length of the second lens group.

The conditional expression (4-3) defines an adequate range of the focal length of the second lens group. With satisfying the conditional expression (4-3), the variable magnification optical system according to the fourth embodiment of the present application can suppress variations in spherical aberration and astigmatism upon varying magnification from a wide-angle end state to a telephoto end state.

When the value of (−f2)/ft is equal to or falls below the lower limit value of the conditional expression (4-3), it becomes difficult to suppress variations in spherical aberration and astigmatism generated in the second lens group upon varying magnification, so that a high optical performance cannot be realized. Meanwhile, in order to attain the advantageous effect of the present application more surely, it is more preferable to set the lower limit value of the conditional expression (4-3) to 0.045.

On the other hand, when the value of (−f2)/ft is equal to or exceeds the upper limit value of the conditional expression (4-3), it becomes necessary to make an amount of variation in distance between the first lens group and the second lens group upon varying magnification larger in order to attain a given variable magnification ratio. Therefore, it becomes difficult to downsize the system, but in addition thereto diameter of on-axis light flux incident onto the second lens group from the first lens group changes largely in association with varying magnification. This causes that variation in spherical aberration upon varying magnification becomes excessive, so it becomes not possible to realize high optical performance. Meanwhile, in order to attain the advantageous effect of the present application more surely, it is more preferable to set the upper limit value of the conditional expression (4-3) to 0.095.

Further, it is desirable that the variable magnification optical system according to the fourth embodiment of the present application satisfies the following conditional expression (4-4):

$$0.300<f3/f4<1.500 \quad (4-4)$$

where f3 denotes a focal length of the third lens group, and f4 denotes a focal length of the fourth lens group.

The conditional expression (4-4) defines an adequate range of the focal length ratio of the third lens group and the fourth lens group, at the time when magnification is varied from a wide-angle end state to a telephoto end state. With satisfying the conditional expression (4-4), the variable magnification optical system according to the fourth embodiment of the present application can suppress variations in spherical aberration and astigmatism upon varying magnification from the wide-angle end state to the telephoto end state.

When the value of f3/f4 of the conditional expression (4-4) is equal to or falls below the lower limit value, it becomes difficult to suppress variations in spherical aberration and astigmatism generated at the third lens group upon varying magnification, so that a high optical performance cannot be realized. Meanwhile, in order to attain the advantageous effect of the present application more surely, it is more preferable to set the lower limit value of the conditional expression (4-4) to 0.600.

On the other hand, when the value of f3/f4 is equal to or exceeds the upper limit value of the conditional expression (4-4), it becomes difficult to suppress variations in spherical aberration and astigmatism generated at the fourth lens group upon varying magnification, and it becomes impossible to realize high optical performance. Meanwhile, in order to attain the advantageous effect of the present application more surely, it is more preferable to set the upper limit value of the conditional expression (4-4) to 1.250.

Further, it is desirable that the variable magnification optical system according to the fourth embodiment of the present application has an aperture stop, and a distance between the aperture stop and the fourth lens group is not varied upon varying magnification from the wide angle end state to the telephoto end state. With this configuration, it is possible to suppress variation in height of off-axis light from the optical axis incident onto the fourth lens group upon varying magnification from the wide angle end state to the telephoto end state, so variations in astigmatism and distortion upon varying magnification can be suppressed.

Further, it is desirable that the variable magnification optical system according to the fourth embodiment of the present application has an aperture stop and the aperture stop is disposed along the optical axis between the second lens group and the third lens group. With this configuration, it is possible to suppress variation in height of on-axis light from the optical axis incident onto the third lens group upon varying magnification from the wide angle end state to the telephoto end state, so variation in spherical aberration upon varying magnification can be suppressed.

Further, it is desirable that, in the variable magnification optical system according to the fourth embodiment of the present application, the third lens group is moved toward the image side, upon focusing from an infinitely distant object to a close distance object. The variable magnification optical system according to the fourth embodiment of the present application, can carry out focusing effectively from the infinitely distant object to the close distance object, by moving the third lens group toward the image side upon focusing, and variations in spherical aberration and astigmatism can be suppressed.

Further, it is desirable that, in the variable magnification optical system according to the fourth embodiment of the present application, a distance between the first lens group and the second lens group increases upon varying magnification from the wide angle end state to the telephoto end state. With this configuration, it is possible to increase magnification of the second lens group, so that it is possible to realize high variable magnification ratio effectively and to suppress variations in spherical aberration and astigmatism upon varying magnification.

Further, it is desirable that, in the variable magnification optical system according to the fourth embodiment of the present application, a distance between the second lens group and the third lens group decreases upon varying magnification from the wide angle end state to the telephoto end state. With this configuration, it is possible to increase a composite magnification of the third to the fifth lens groups, so that it is possible to realize high magnification ratio effectively and to suppress variations in spherical aberration and astigmatism upon varying magnification.

Further, it is desirable that, in the variable magnification optical system according to the fourth embodiment of the present application, the fifth lens group has positive refractive power. With this configuration, a use magnification of the fifth lens group becomes smaller than an equi-magnification so that it is possible to make a composite focal length of the first to the fourth lens groups relatively larger. As a result, influence such as eccentric coma aberration caused by eccentricity generated among lenses in the first to the fourth lens groups upon assembling can be suppressed small relatively, and high optical performance can be realized.

An optical apparatus of the present application is equipped with a variable magnification optical system according to the fourth embodiment of the present application. Thus, an optical apparatus having a high variable magnification ratio, a small size, and a high optical performance can be realized.

The method for manufacturing a variable magnification optical system according to the fourth embodiment of the present application, is a method for manufacturing a variable magnification optical system comprising, in order from an object side along the optical axis: a first lens group having positive refractive power; a second lens group having negative refractive power; a third lens group having positive refractive power; a fourth lens group having positive refractive power; and a fifth lens group; the method comprising the steps of:

constructing the third lens group and the fifth lens group to satisfy the following conditional expression (4-1):

$$0.010 < (d5it - d5iw)/(d3it - d3iw) < 1.000 \quad (4\text{-}1)$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane;

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane; and constructing the third lens group to be moved along the optical axis, upon focusing.

With this method, it is possible to manufacture a variable magnification optical system having a high variable magnification ratio, a small size, and a high optical performance upon focusing from an infinitely distant object to a closely distant object.

Hereinafter, variable magnification optical systems relating to numerical examples according to the first to fourth embodiments of the present application will be explained with reference to the accompanying drawings.

First Example

FIGS. 1A, 1B and 1C are sectional views showing a variable magnification optical system according to the First Example which is common to the first to fourth embodiments of the present application, in a wide-angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having positive refractive power. An aperture stop S is disposed between the second lens group G2 and the third lens group G3.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22 and a cemented lens constructed by a double convex positive lens L23 cemented with a negative meniscus lens L24 having a concave surface facing the object side. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon varying magnification from the wide-angle end state to the telephoto end state, the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and an image plane I are varied, respectively.

To be specific, the first lens group G1 to the fifth lens group G5 are moved toward the object side. Meanwhile, the aperture stop S is moved toward the object side integrally with the fourth lens group G4 upon varying magnification.

Focusing from an infinitely distant object to a close distance object is carried out by moving the third lens group G3 along the optical axis toward the image plane I.

Consequently, upon varying magnification, the distance between the first lens group G1 and the second lens group G2 is increased, the distance between the second lens group G2 and the third lens group G3 is decreased, the distance between the third lens group G3 and the fourth lens group G4 is increased, the distance between the fourth lens group G4 and the fifth lens group G5 is increased, and the distance between the fifth lens group G5 and the image plane I is increased. Meanwhile, upon varying magnification, a distance between the aperture stop S and the third lens group G3 is decreased.

Due to the aboves, the variable magnification optical system according to the present Example has high variable magnification ratio and is compact in size.

Table 1 below shows various values of the variable magnification optical system according to the present Example.

In Table 1, f denotes a focal length, and BF denotes a back focal length, that is, a distance on the optical axis between the most image side lens surface and the image plane I.

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and vd denotes an Abbe number for d-line (wavelength λ=587.6 nm). Further, OP denotes an object surface, "Variable" denotes a variable surface-to-surface distance, S denotes an aperture stop, and I denotes the image plane. Meanwhile, a radius of curvature r=∞ denotes a plane surface. As for an aspherical surface, "*" is attached to the surface number and a value of a paraxial radius of curvature is indicated in the column of the radius of curvature r. Refractive index of air nd=1.000000 is omitted in the description.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8+A10h^{10}+A12h^{12}$$

where h denotes a vertical height from the optical axis, x denotes a distance in the direction of the optical axis from a tangent surface at a vertex of the aspherical surface to the aspherical surface at the vertical height h from the optical axis (a sag amount), κ denotes a conical coefficient, A4, A6, A8, A10 and A12 denote respective aspherical coefficients, and r denotes a radius of curvature of a reference sphere (a paraxial radius of curvature). "E-n", where n is an integer, denotes "×10$^{-n}$", for example, "1.234E-05" denotes "1.234× 10$^{-5}$". The 2nd order aspherical surface coefficient A2 is 0, and omitted in the description.

In [Various Data], FNO denotes an F-number, ω denotes a half angle of view (unit "°"), Y denotes an image height, TL denotes a total length of the variable magnification optical system (that is, a distance on the optical axis from the first surface to the image plane I upon focusing on the infinite distance object), do denotes a variable interval between an n-th surface and an (n+1)-th surface and φ denotes a diameter of the aperture stop S. Meanwhile, these values are one upon focusing on the infinitely distant object. Further, W denotes the wide-angle end state, M denotes the intermediate focal length state, and T denotes the telephoto end state.

In [Movement Amount of Focusing Group upon focusing], an amount of movement of the third lens group as the focusing group upon focusing from the infinite distance focusing state to the close distance focusing state (shooting magnification is −0.0100), is shown. Here, regarding the direction of the focusing lens group, movement toward the image side is made positive. Shooting distance is a distance from the object to the image plane.

In [Lens Group Data], a starting surface ST and a focal length f are shown for each lens group.

In [Values for Conditional Expressions], values corresponding to respective conditional expressions in the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Meanwhile, the above-mentioned reference symbols in Table 1 are also employed in the same manner in Tables of the after-mentioned Examples.

TABLE 1

First Example

[Surface Data]

| m | r | d | nd | νd |
|---|---|---|----|----|
| OP | ∞ | | | |
| 1 | 135.6506 | 1.6350 | 1.950000 | 29.37 |
| 2 | 41.9822 | 8.2991 | 1.497820 | 82.57 |
| 3 | −344.6351 | 0.1000 | | |
| 4 | 45.0112 | 4.7994 | 1.834810 | 42.73 |
| 5 | 373.7571 | variable | | |
| *6 | 345.5995 | 1.0000 | 1.851348 | 40.10 |
| 7 | 9.1082 | 4.2862 | | |
| 8 | −21.4543 | 1.0000 | 1.903660 | 31.27 |
| 9 | 38.9573 | 0.7420 | | |
| 10 | 26.9213 | 4.0891 | 1.808090 | 22.74 |
| 11 | −12.6120 | 1.0000 | 1.883000 | 40.66 |
| 12 | −42.4301 | variable | | |
| 13(S) | ∞ | variable | | |
| 14 | 29.6793 | 1.0000 | 1.883000 | 40.66 |
| 15 | 15.0612 | 3.3397 | 1.593190 | 67.90 |
| 16 | −42.4934 | variable | | |
| 17 | 12.5743 | 8.9691 | 1.717000 | 47.97 |
| 18 | −33.1381 | 1.0000 | 1.883000 | 40.66 |
| 19 | 10.7605 | 2.0000 | | |
| 20 | 19.2566 | 3.2971 | 1.516800 | 63.88 |
| 21 | −11.7331 | 1.0000 | 1.850260 | 32.35 |
| 22 | −20.8570 | 1.5000 | | |
| 23 | −40.3315 | 1.0000 | 1.950000 | 29.37 |
| 24 | 11.6425 | 3.4850 | 1.672700 | 32.18 |
| 25 | −26.8269 | 0.1735 | | |
| 26 | 33.9424 | 5.2543 | 1.581440 | 40.98 |
| 27 | −8.0332 | 1.0000 | 1.820798 | 42.71 |
| *28 | −31.1190 | variable | | |
| 29 | −40.0000 | 2.0872 | 1.497820 | 82.57 |
| 30 | −16.7056 | 1.0000 | 1.834410 | 37.28 |
| *31 | −21.8116 | BF | | |
| I | ∞ | | | |

TABLE 1-continued

First Example

[Aspherical Data]

m: 6

| κ | 11.00000 |
|---|----------|
| A4 | 3.74799E−05 |
| A6 | −8.44116E−08 |
| A8 | −3.25426E−09 |
| A10 | 4.01677E−11 |
| A12 | −1.75260E−13 | m: 28

| κ | 1.00000 |
|---|---------|
| A4 | −7.52150E−05 |
| A6 | −3.56328E−07 |
| A8 | 1.74159E−09 |
| A10 | −3.33007E−11 |
| A12 | 0.00000E+00 | m: 31

| κ | 1.00000 |
|---|---------|
| A4 | 2.74991E−05 |
| A6 | −2.52954E−09 |
| A8 | −1.90467E−10 |
| A10 | 0.00000E+00 |
| A12 | 0.00000E+00 |

[Various Data]
Variable magnification ratio 14.13

| | W | T |
|---|---|---|
| f | 9.27~ | 130.95 |
| FNO | 4.12~ | 5.77 |
| ω | 42.66~ | 3.35° |
| Y | 8.00~ | 8.00 |
| TL | 111.87~ | 169.05 |

| | W | M | T |
|---|---|---|---|
| f | 9.27000 | 60.49999 | 130.94999 |
| ω | 42.66043 | 7.22371 | 3.35343 |
| FNO | 4.12 | 5.77 | 5.77 |
| φ | 8.49 | 9.57 | 11.01 |
| d5 | 2.10000 | 36.64491 | 46.82787 |
| d12 | 24.15923 | 5.26241 | 2.20000 |
| d13 | 4.86826 | 4.21826 | 1.80000 |
| d16 | 2.25000 | 2.90000 | 5.31826 |
| d28 | 1.50000 | 29.01348 | 34.90774 |
| BF | 13.93934 | 14.90154 | 14.93894 |

[Movement Amount of Focusing Group upon focusing]

| | W | M | T |
|---|---|---|---|
| Shooting magnification | −0.0100 | −0.0100 | −0.0100 |
| Shooting distance | 901.6746 | 5886.4066 | 12728.2773 |
| Amount of movement | 0.1610 | 0.1701 | 0.3030 |

[Lens Group Data]

| Group | ST | f |
|---|---|---|
| 1 | 1 | 69.37620 |
| 2 | 6 | −9.50000 |
| 3 | 14 | 41.26133 |
| 4 | 17 | 51.13596 |
| 5 | 29 | 150.09211 |

[Values for Conditional Expressions]

| (1-1) | $(-f2)/ft = 0.073$ |
| (1-2) | $f3/fw = 4.451$ |
| (1-3) | $(d4t - d4w)/f4 = 0.653$ |
| (1-4) | $(d5it - d5iw)/(d3it - d3iw) = 0.027$ |
| (2-1) | $f3/fw = 4.451$ |
| (2-2) | $(d1it - d1iw)/fw = 6.168$ |
| (2-3) | $(d5it - d5iw)/(d3it - d3iw) = 0.027$ |

TABLE 1-continued

First Example

| | |
|---|---|
| (2-4) | f3/f4 = 0.807 |
| (3-1) | (d4t − d4w)/f4 = 0.653 |
| (3-2) | f3/fw = 4.451 |
| (3-3) | (d1it − d1iw)/fw = 6.168 |
| (3-4) | f3/ft = 0.315 |
| (4-1) | (d5it − d5iw)/(d3it − d3iw) = 0.027 |
| (4-2) | (d4t − d4w)/f4 = 0.653 |
| (4-3) | (−f2)/ft = 0.073 |
| (4-4) | f3/f4 = 0.807 |

Figure 2B:
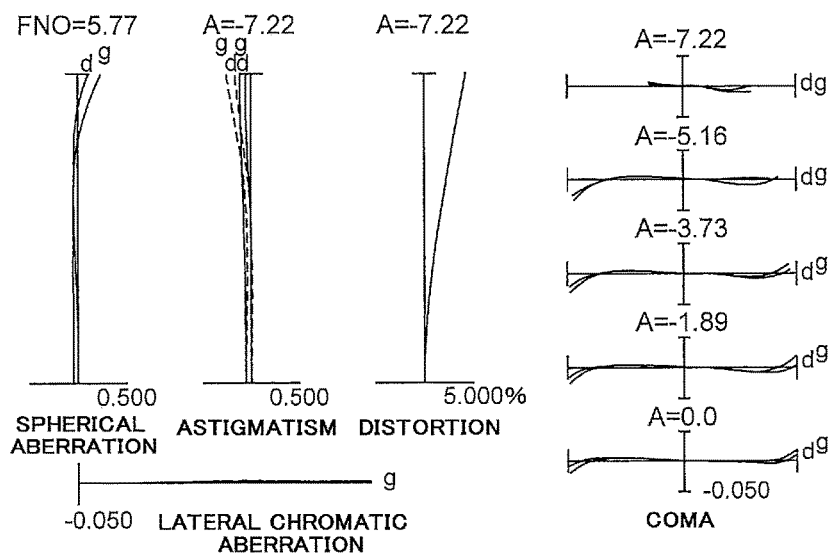
Figure 2C:
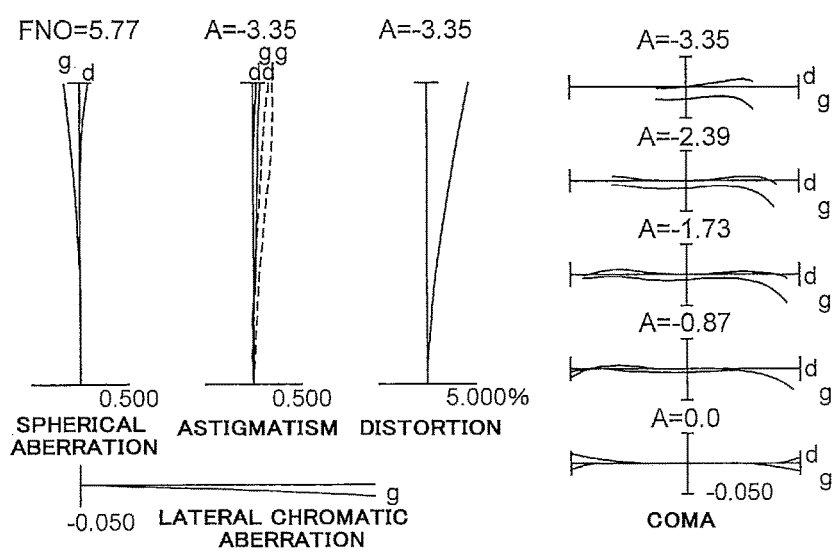

FIGS. 2A, 2B and 2C are graphs showing various aberrations of the variable magnification optical system according to the First Example of the present application upon focusing on an infinite distance object, in the wide-angle end state, in the intermediate focal length state, and in the telephoto end state, respectively.

Figure 3A:
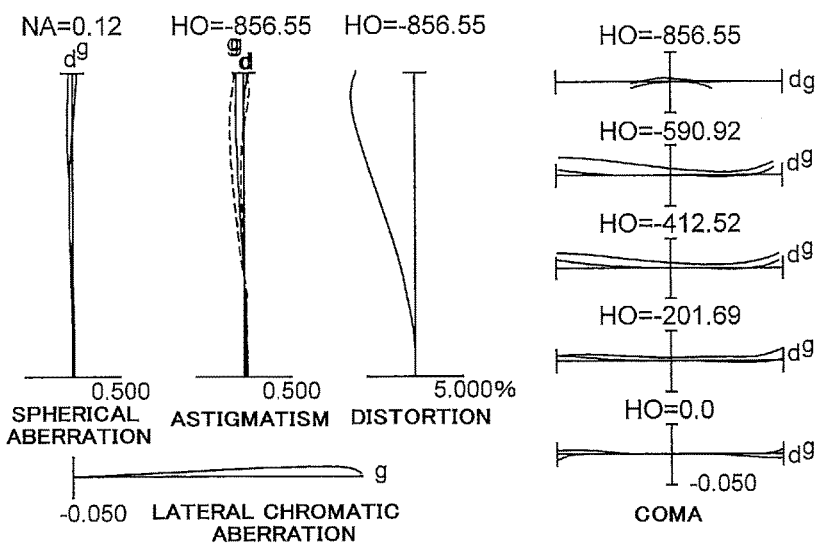
FIGS. 3A, 3B and 3C are graphs showing various aberrations of the variable magnification optical system according to the First Example of the present application upon focusing on the close distance object (shooting magnification −0.0100), in the wide angle end state, in the intermediate focal length state and in the telephoto end state, respectively.
Figure 3B:
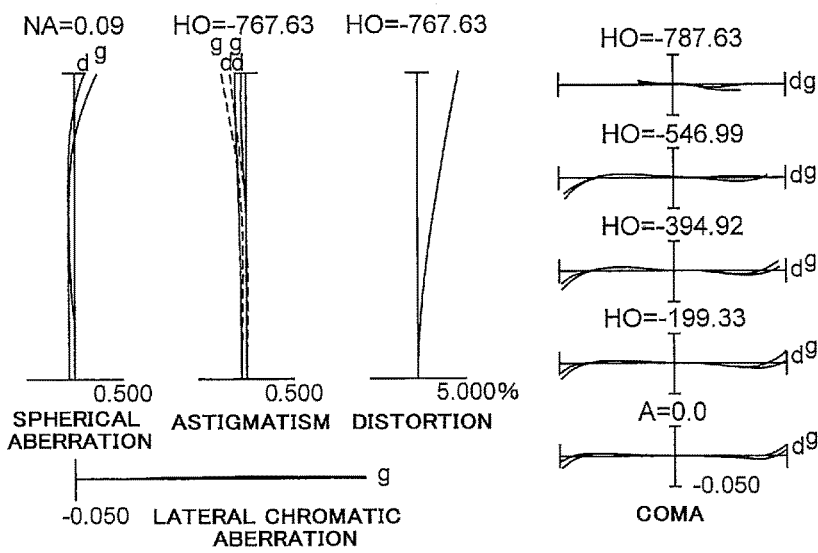
Figure 3C:
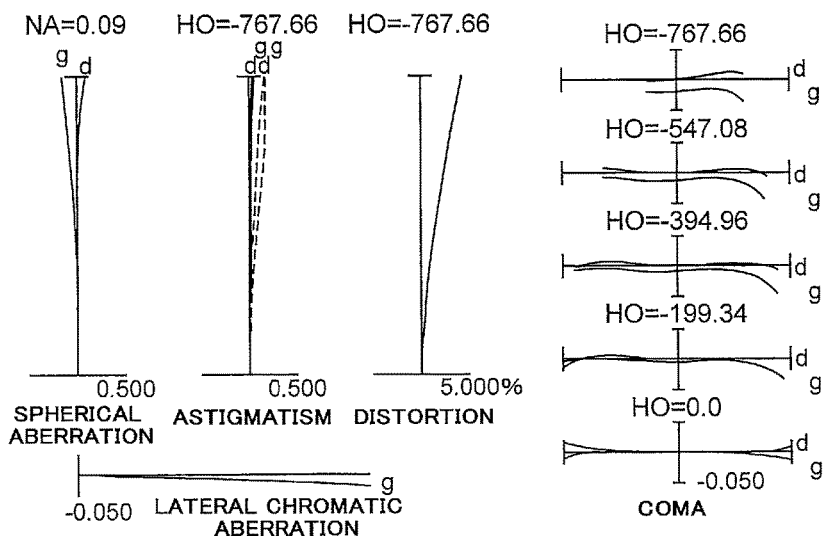

FIGS. 3A, 3B and 3C are graphs showing various aberrations of the variable magnification optical system according to the First Example of the present application upon focusing on a close distance object, in the wide-angle end state, in the intermediate focal length state and in the telephoto end state (shooting magnification is −0.0100), respectively.

In respective graphs, FNO denotes an F-number, NA denotes a numerical aperture of a light ray exiting from a most image side lens, and A denotes an incident angle of a light ray, that is, a half angle of view (unit "°"), and H0 denotes an object height (unit:mm). d denotes an aberration curve at d-line (wavelength λ=587.6 nm), g denotes an aberration curve at g-line (wavelength λ=435.8 nm), and when neither d nor g is mentioned, a curve indicates an aberration at the d-line. In the graph showing astigmatism, a solid line indicates a sagittal image plane, and a broken line indicates a meridional image plane. Incidentally, the above-mentioned symbols in the present Example are also employed in the same manner in the graphs of the after-mentioned Examples.

As is apparent from the respective graphs, the variable magnification optical system according to the present Example shows good corrections to various aberrations from the wide-angle end state to the telephoto end state and from a focusing state on an infinitely distant object to a focusing state on a short distance object, and also shows a high optical performance.

Second Example

Figure 4A:
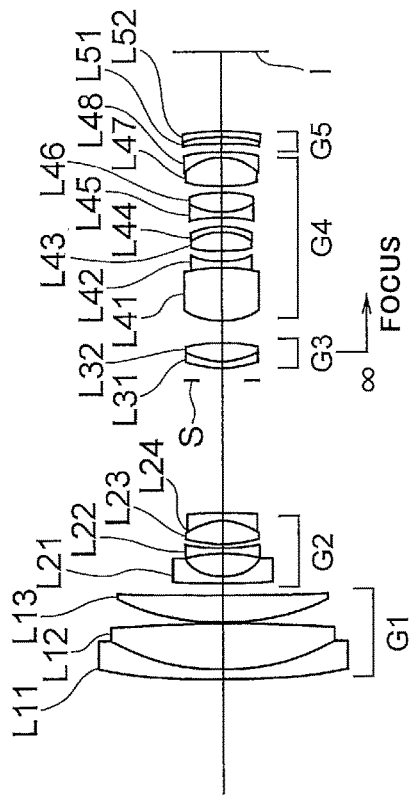
FIGS. 4A, 4B and 4C are sectional views showing a variable magnification optical system according to a Second Example common to the first to the fourth embodiments of the present application, in a wide-angle end state, in an intermediate focal length state and in a telephoto end state, respectively.
Figure 4B:
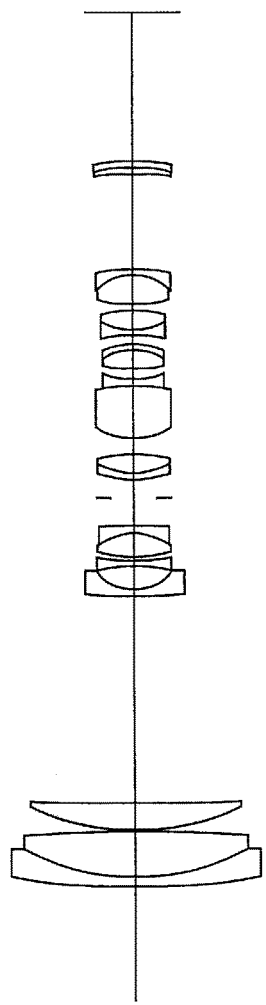
Figure 4C:
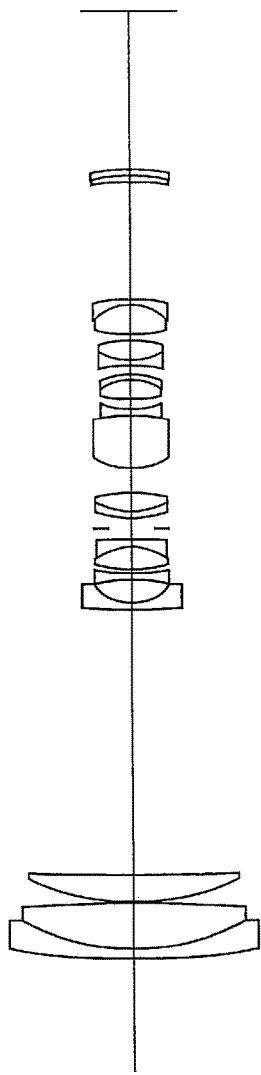

FIGS. 4A, 4B, and 4C are sectional views showing a variable magnification optical system according to the Second Example which is common to the first to the fourth embodiments of the present application, in a wide-angle end state, in a first intermediate focal length state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having negative refractive power. An aperture stop S is disposed between the second lens group G2 and the third lens group G3.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22 and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon varying magnification from the wide-angle end state to the telephoto end state, the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the image plane I are varied, respectively.

To be specific, the first lens group G1 to the fifth lens group G5 are moved toward the object side. Meanwhile, the aperture stop S is moved toward the object side integrally with the fourth lens group G4 upon varying magnification.

Focusing from an infinitely distant object to a close distance object is carried out by moving the third lens group G3 along the optical axis toward the image plane I.

Consequently, upon varying magnification, the distance between the first lens group G1 and the second lens group G2 is increased, the distance between the second lens group G2 and the third lens group G3 is decreased, the distance between the fourth lens group G4 and the fifth lens group G5 is increased, and the distance between the fifth lens group G5 and the image plane I is increased. The distance between the third lens group G3 and the fourth lens group G4 is decreased from the wide angle end state to the intermediate focal length state, and increased from the intermediate focal length state to the telephoto end state. Meanwhile, upon varying magnification, a distance between the aperture stop S and the third lens group G3 is increased from the wide angle end state to the intermediate focal length state, and is decreased from the intermediate focal length state to the telephoto end state.

Due to the aboves, the variable magnification optical system according to the present Example has high variable magnification ratio and is compact in size.

Table 2 below shows various values of the variable magnification optical system according to the present Example.

TABLE 2

Second Example

[Surface Data]

| m | r | d | nd | vd |
|---|---|---|---|---|
| OP | ∞ | | | |
| 1 | 141.5341 | 1.6350 | 1.950000 | 29.37 |
| 2 | 42.4212 | 8.4111 | 1.497820 | 82.57 |
| 3 | −315.7583 | 0.1000 | | |
| 4 | 44.6738 | 4.8257 | 1.834810 | 42.73 |
| 5 | 329.2991 | variable | | |
| *6 | 500.0000 | 1.0000 | 1.851348 | 40.10 |
| 7 | 9.1215 | 4.1187 | | |
| 8 | −36.3703 | 1.0000 | 1.903660 | 31.27 |
| 9 | 36.8310 | 0.5585 | | |
| 10 | 20.9196 | 4.4577 | 1.808090 | 22.74 |
| 11 | −11.3592 | 1.0000 | 1.883000 | 40.66 |
| 12 | 231.4820 | variable | | |
| 13(S) | ∞ | variable | | |
| 14 | 27.6206 | 1.0000 | 1.883000 | 40.66 |
| 15 | 13.6993 | 3.2013 | 1.593190 | 67.90 |
| 16 | −42.3833 | variable | | |
| 17 | 13.2112 | 9.5050 | 1.717000 | 47.97 |
| 18 | −49.0716 | 1.0000 | 1.883000 | 40.66 |
| 19 | 11.5987 | 2.0000 | | |
| 20 | 23.5510 | 3.3277 | 1.516800 | 63.88 |
| 21 | −10.5463 | 1.0000 | 1.850260 | 32.35 |
| 22 | −17.4426 | 1.5000 | | |
| 23 | −39.5142 | 1.0000 | 1.950000 | 29.37 |
| 24 | 14.3546 | 3.3123 | 1.672700 | 32.18 |
| 25 | −31.7031 | 1.0351 | | |
| 26 | 20.4892 | 5.4304 | 1.581440 | 40.98 |
| 27 | −9.0024 | 1.0000 | 1.820798 | 42.71 |
| *28 | −40.3228 | variable | | |
| 29 | −59.5141 | 1.1354 | 1.497820 | 82.57 |
| 30 | −26.1606 | 1.0000 | 1.834410 | 37.28 |
| *31 | −50.8846 | BF | | |
| I | ∞ | | | |

[Aspherical Data]

m: 6

| κ | −9.00000 |
|---|---|
| A4 | 3.41888E−05 |
| A6 | −2.73054E−08 |
| A8 | −3.06893E−09 |
| A10 | 3.86737E−11 |
| A12 | −1.69230E−13 | m: 28

| κ | 1.00000 |
|---|---|
| A4 | −6.20378E−05 |
| A6 | −2.88775E−07 |
| A8 | 3.11023E−09 |
| A10 | −4.32584E−11 |
| A12 | 0.00000E+00 | m: 31

| κ | 1.00000 |
|---|---|
| A4 | 2.66064E−05 |
| A6 | 1.04446E−07 |
| A8 | −5.78528E−10 |

TABLE 2-continued

Second Example

| A10 | 0.00000E+00 |
|---|---|
| A12 | 0.00000E+00 |

[Various Data]
Variable magnification ratio 14.13

| | W | T |
|---|---|---|
| f | 9.27~ | 130.95 |
| FNO | 4.12~ | 5.81 |
| ω | 42.67~ | 3.42° |
| Y | 8.00~ | 8.00 |
| TL | 111.02~ | 169.05 |

| | W | M | T |
|---|---|---|---|
| f | 9.27006 | 60.50093 | 130.95187 |
| ω | 42.67385 | 7.37624 | 3.41696 |
| FNO | 4.12 | 5.77 | 5.81 |
| φ | 8.83 | 9.26 | 10.38 |
| d5 | 2.10000 | 37.01608 | 47.51778 |
| d12 | 23.62886 | 5.00952 | 2.20000 |
| d13 | 2.40610 | 3.40014 | 1.80000 |
| d16 | 3.89404 | 2.90000 | 4.50014 |
| d28 | 1.50000 | 16.70292 | 20.53836 |
| BF | 13.93925 | 26.92305 | 28.93970 |

[Movement Amount of Focusing Group upon focusing]

| | W | M | T |
|---|---|---|---|
| Shooting magnification | −0.0100 | −0.0100 | −0.0100 |
| Shooting distance | 902.7175 | 5891.6497 | 12742.6968 |
| Amount of movement | 0.1146 | 0.1322 | 0.2361 |

[Lens Group Data]

| Group | ST | f |
|---|---|---|
| 1 | 1 | 70.20776 |
| 2 | 6 | −8.28282 |
| 3 | 14 | 40.62229 |
| 4 | 17 | 37.83706 |
| 5 | 29 | −216.44842 |

[Values for Conditional Expressions]

| (1-1) | (−f2)/ft = 0.063 |
|---|---|
| (1-2) | f3/fw = 4.382 |
| (1-3) | (d4t − d4w)/f4 = 0.503 |
| (1-4) | (d5it − d5iw)/(d3it − d3iw) = 0.433 |
| (2-1) | f3/fw = 4.382 |
| (2-2) | (d1it − d1iw)/fw = 6.260 |
| (2-3) | (d5it − d5iw)/(d3it − d3iw) = 0.433 |
| (2-4) | f3/f4 = 1.074 |
| (3-1) | (d4t − d4w)/f4 = 0.503 |
| (3-2) | f3/fw = 4.382 |
| (3-3) | (d1it − d1iw)/fw = 6.260 |
| (3-4) | f3/ft = 0.310 |
| (4-1) | (d5it − d5iw)/(d3it − d3iw) = 0.433 |
| (4-2) | (d4t − d4w)/f4 = 0.503 |
| (4-3) | (−f2)/ft = 0.063 |
| (4-4) | f3/f4 = 1.074 |

Figure 5A:
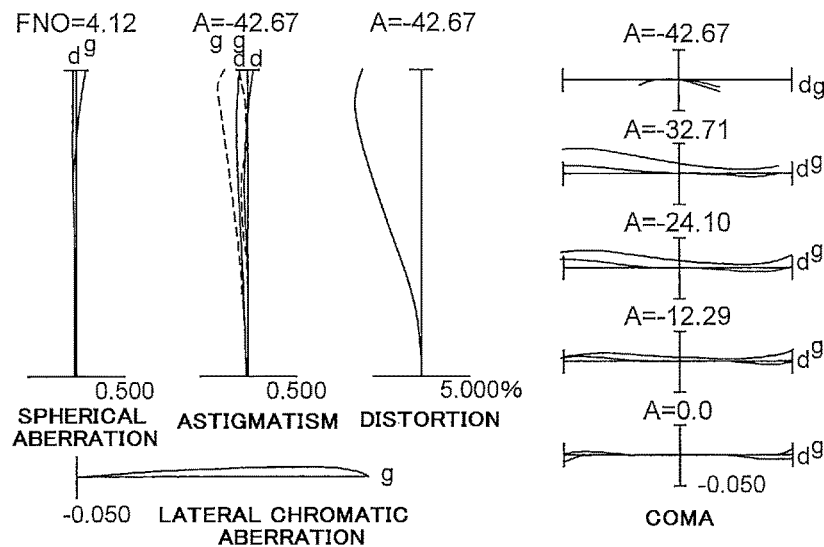
FIGS. 5A, 5B and 5C are graphs showing various aberrations of the variable magnification optical system according to the Second Example of the present application upon focusing on an infinite distance object, in the wide-angle end state, in the intermediate focal length state, and in the telephoto end state, respectively.
Figure 5B:
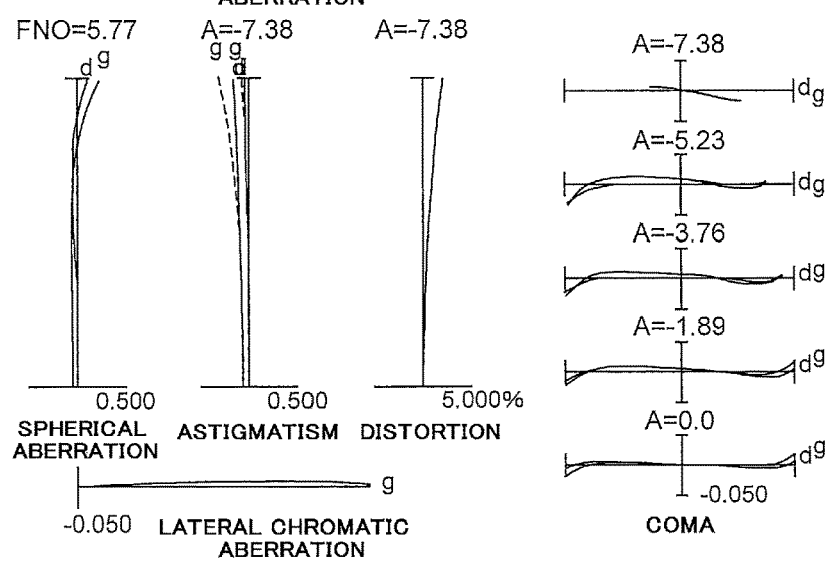
Figure 5C:
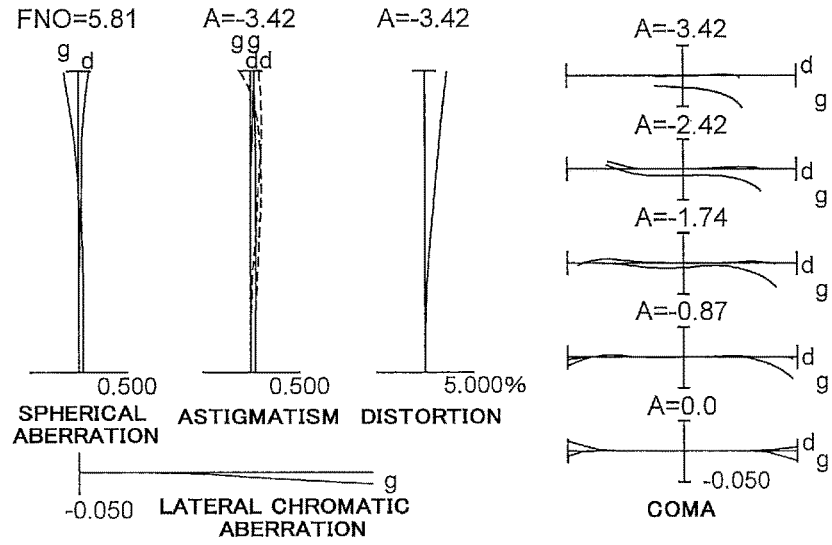

FIGS. 5A, 5B and 5C are graphs showing various aberrations of the variable magnification optical system according to the Second Example of the present application upon focusing on an infinite distance object, in the wide-angle end state, in the intermediate focal length state, and in the telephoto end state, respectively.

Figure 6A:
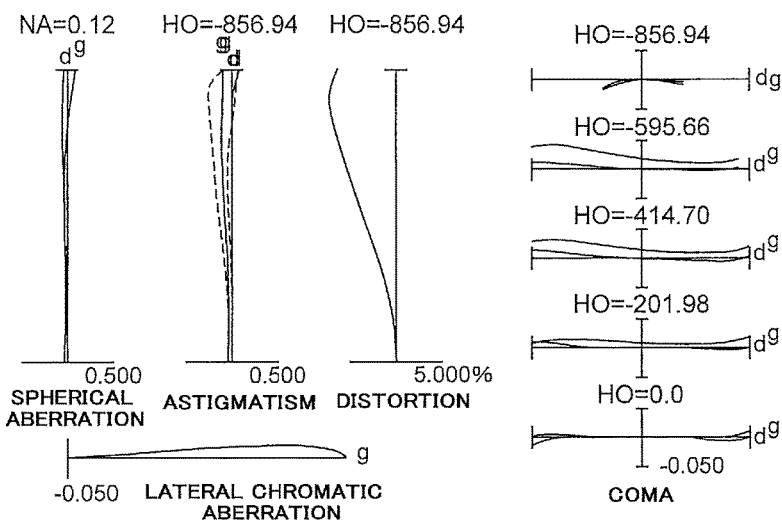
FIGS. 6A, 6B and 6C are graphs showing various aberrations of the variable magnification optical system according to the Second Example of the present application upon focusing on the close distance object (shooting magnification −0.0100), in the wide angle end state, in the intermediate focal length state and in the telephoto end state, respectively.
Figure 6B:
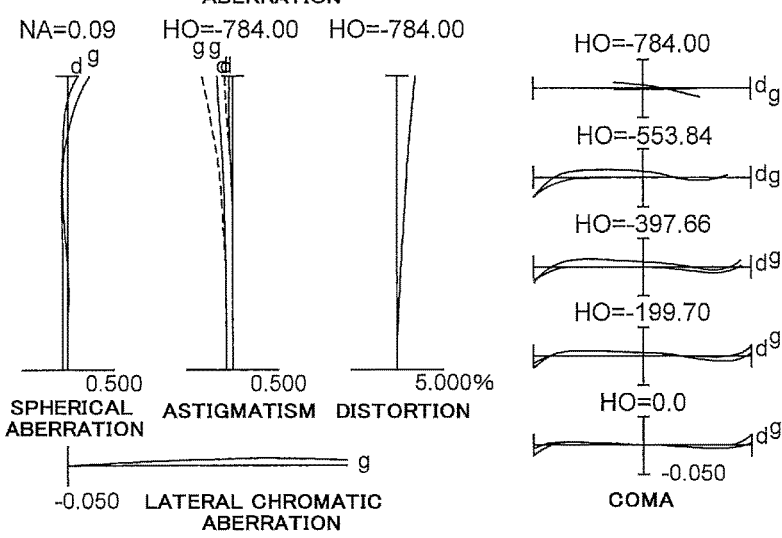
Figure 6C:
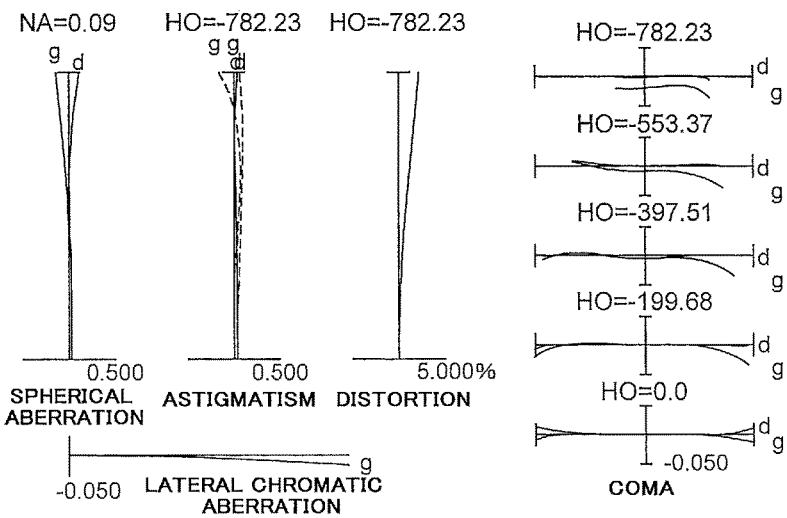

FIGS. 6A, 6B and 6C are graphs showing various aberrations of the variable magnification optical system according to the Second Example of the present application upon focusing on a close distance object, in the wide-angle end state, in the intermediate focal length state and in the telephoto end state (shooting magnification is −0.0100), respectively.

As is apparent from the respective graphs, the variable magnification optical system according to the present Example shows good corrections to various aberrations from the wide-angle end state to the telephoto end state and from a focusing state on an infinitely distant object to a focusing state on a short distance object, and also shows a high optical performance.

Third Example

Figure 7A:
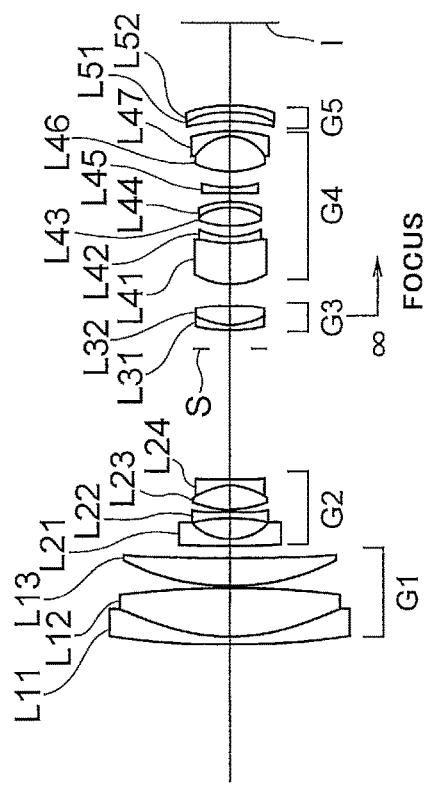
FIGS. 7A, 7B and 7C are sectional views showing a variable magnification optical system according to a Third Example common to the first to the fourth embodiments of the present application, in a wide-angle end state, in an intermediate focal length state and in a telephoto end state, respectively.
Figure 7B:
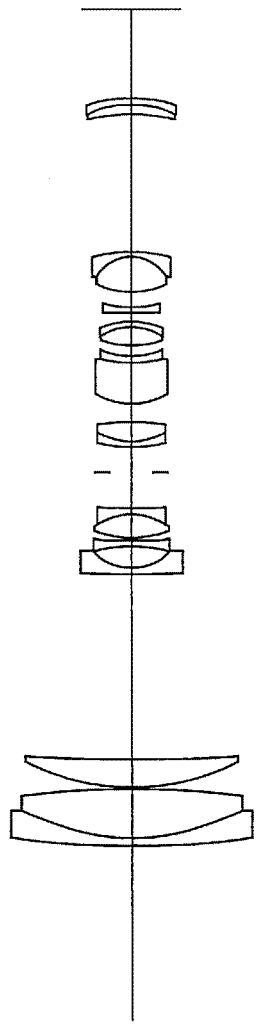
Figure 7C:
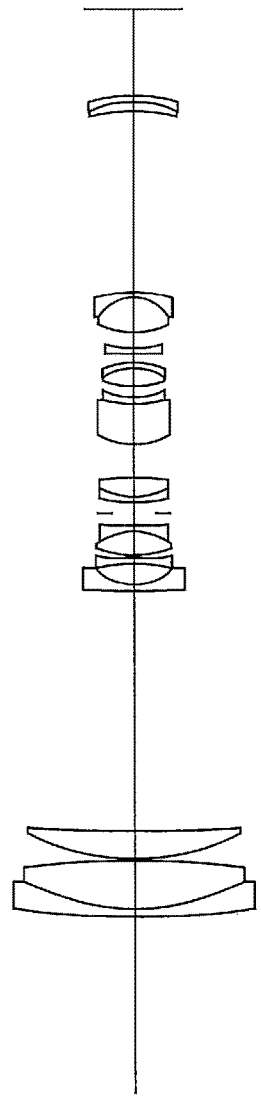

FIGS. 7A, 7B and 7C are sectional views showing a variable magnification optical system according to the Third Example which is common to the first to the fourth embodiments of the present application, in a wide-angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having positive refractive power. An aperture stop S is disposed between the second lens group G2 and the third lens group G3.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22 and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a negative meniscus lens L45 having a convex surface facing the object side, and a cemented lens constructed by a double convex positive lens L46 cemented with a negative meniscus lens L47 having a concave surface facing the object side. Meanwhile, the negative meniscus lens L45 is a glass mold type aspherical lens of which a lens surface on the object side is formed into an aspherical shape, and the negative meniscus lens L47 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon varying magnification from the wide-angle end state to the telephoto end state, the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5 and a distance between the fifth lens group G5 and the image plane I, are varied respectively.

To be specific, the first lens group G1 to the fourth lens group G4 are moved toward the object side. The fifth lens group G5 is moved toward the object side from the wide angle end state to the intermediate focal length state, and is moved toward the image side from the intermediate focal length state to the telephoto end state. Meanwhile, the aperture stop S is moved toward the object side integrally with the fourth lens group G4 upon varying magnification.

Focusing from an infinitely distant object to a close distance object is carried out by moving the third lens group G3 along the optical axis toward the image plane I.

Consequently, upon varying magnification, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is decreased from the wide angle end state to the intermediate focal length state, and is increased from the intermediate focal length state to the telephoto end state. The distance between the fifth lens group G5 and the image plane I is increased from the wide angle end state to the intermediate focal length state, and is decreased from the intermediate focal length state to the telephoto end state. Meanwhile, upon varying magnification, a distance between the aperture stop S and the third lens group G3 is increased from the wide angle end state to the intermediate focal length state, and is decreased from the intermediate focal length state to the telephoto end state.

Due to the aboves, the variable magnification optical system according to the present Example has high variable magnification ratio and is compact in size.

Table 3 below shows various values of the variable magnification optical system according to the present Example.

TABLE 3

Third Example

[Surface Data]

| m | r | d | nd | vd |
|---|---|---|---|---|
| OP | ∞ | | | |
| 1 | 125.4788 | 1.6350 | 1.950000 | 29.37 |
| 2 | 42.8963 | 8.6176 | 1.497820 | 82.57 |
| 3 | −200.0000 | 0.1000 | | |
| 4 | 41.6251 | 4.9380 | 1.816000 | 46.59 |
| 5 | 230.0985 | variable | | |
| *6 | 500.0000 | 1.0000 | 1.851348 | 40.10 |
| 7 | 9.5652 | 3.8048 | | |
| 8 | −36.8357 | 1.0000 | 1.883000 | 40.66 |

TABLE 3-continued

Third Example

| | | | | |
|---|---|---|---|---|
| 9 | 44.2906 | 0.3520 | | |
| 10 | 18.6401 | 4.2703 | 1.808090 | 22.74 |
| 11 | −12.0124 | 1.0000 | 1.902650 | 35.72 |
| 12 | 83.8674 | variable | | |
| 13(S) | ∞ | variable | | |
| 14 | 23.0558 | 1.0000 | 1.883000 | 40.66 |
| 15 | 12.1495 | 3.4115 | 1.593190 | 67.90 |
| 16 | −46.4710 | variable | | |
| 17 | 13.4790 | 6.8280 | 1.816000 | 46.59 |
| 18 | 22.4551 | 1.0000 | 1.850260 | 32.35 |
| 19 | 10.9985 | 2.0000 | | |
| 20 | 19.0986 | 3.2170 | 1.516800 | 63.88 |
| 21 | −11.7780 | 1.0000 | 1.850260 | 32.35 |
| 22 | −21.0372 | 1.5000 | | |
| *23 | 689.8893 | 1.0000 | 1.806100 | 40.73 |
| 24 | 15.3049 | 2.8460 | | |
| 25 | 16.4239 | 5.9978 | 1.567320 | 42.58 |
| 26 | −8.0000 | 1.0000 | 1.851348 | 40.10 |
| *27 | −24.2284 | variable | | |
| 28 | −40.0000 | 1.6708 | 1.497820 | 82.57 |
| 29 | −19.2635 | 1.0000 | 1.834410 | 37.28 |
| *30 | −24.2511 | BF | | |
| I | ∞ | | | |

[Aspherical Data]

m: 6

| | |
|---|---|
| κ | 11.00000 |
| A4 | 1.38428E−05 |
| A6 | 2.39881E−07 |
| A8 | −9.46864E−09 |
| A10 | 1.17699E−10 |
| A12 | −5.24010E−13 | m: 23

| | |
|---|---|
| κ | 1.00000 |
| A4 | −1.65484E−05 |
| A6 | 7.20023E−07 |
| A8 | −8.24637E−09 |
| A10 | 1.55522E−10 |
| A12 | 0.00000E+00 | m: 27

| | |
|---|---|
| κ | 1.00000 |
| A4 | −5.27520E−05 |
| A6 | 1.28445E−07 |
| A8 | −5.41725E−09 |
| A10 | 1.08848E−11 |
| A12 | 0.00000E+00 | m: 30

| | |
|---|---|
| κ | 1.00000 |
| A4 | 3.58303E−05 |
| A6 | −1.13073E−07 |
| A8 | 6.69333E−10 |
| A10 | 0.00000E+00 |
| A12 | 0.00000E+00 |

[Various Data]
Variable magnification ratio 14.13

| | W | T |
|---|---|---|
| f | 10.30~ | 145.50 |
| FNO | 4.12~ | 5.77 |
| ω | 39.66~ | 3.01° |
| Y | 8.00~ | 8.00 |
| TL | 107.35~ | 157.35 |

| | W | M | T |
|---|---|---|---|
| f | 10.30000 | 59.49997 | 145.49942 |
| ω | 39.65540 | 7.34800 | 3.01140 |
| FNO | 4.12 | 5.76 | 5.77 |
| φ | 8.49 | 8.51 | 10.06 |
| d5 | 2.10000 | 32.00138 | 41.35684 |
| d12 | 22.21167 | 6.19340 | 2.20000 |

TABLE 3-continued

Third Example

| | W | M | T |
|---|---|---|---|
| d13 | 3.21330 | 4.23594 | 1.80000 |
| d16 | 4.08103 | 3.05839 | 5.49433 |
| d27 | 1.60536 | 23.96409 | 31.36057 |
| BF | 13.94931 | 15.18421 | 14.94893 |

[Movement Amount of Focusing Group upon focusing]

| | W | M | T |
|---|---|---|---|
| Shooting magnification | −0.0100 | −0.0100 | −0.0100 |
| Shooting distance | 1003.1781 | 5789.3595 | 14161.5191 |
| Amount of movement | 0.1286 | 0.1638 | 0.3103 |

[Lens Group Data]

| Group | ST | f |
|---|---|---|
| 1 | 1 | 62.41033 |
| 2 | 6 | −8.66265 |
| 3 | 14 | 37.00000 |
| 4 | 17 | 45.93796 |
| 5 | 28 | 189.05625 |

[Values for Conditional Expressions]

| | |
|---|---|
| (1-1) | (−f2)/ft = 0.0595 |
| (1-2) | f3/fw = 3.592 |
| (1-3) | (d4t − d4w)/f4 = 0.648 |
| (1-4) | (d5it − d5iw)/(d3it − d3iw) = 0.031 |
| (2-1) | f3/fw = 3.592 |
| (2-2) | (d1it − d1iw)/fw = 4.854 |
| (2-3) | (d5it − d5iw)/(d3it − d3iw) = 0.031 |
| (2-4) | f3/f4 = 0.805 |
| (3-1) | (d4t − d4w)/f4 = 0.648 |
| (3-2) | f3/fw = 3.592 |
| (3-3) | (d1it − d1iw)/fw = 4.854 |
| (3-4) | f3/ft = 0.254 |
| (4-1) | (d5it − d5iw)/(d3it − d3iw) = 0.031 |
| (4-2) | (d4t − d4w)/f4 = 0.648 |
| (4-3) | (−f2)/ft = 0.060 |
| (4-4) | f3/f4 = 0.805 |

Figure 8A:
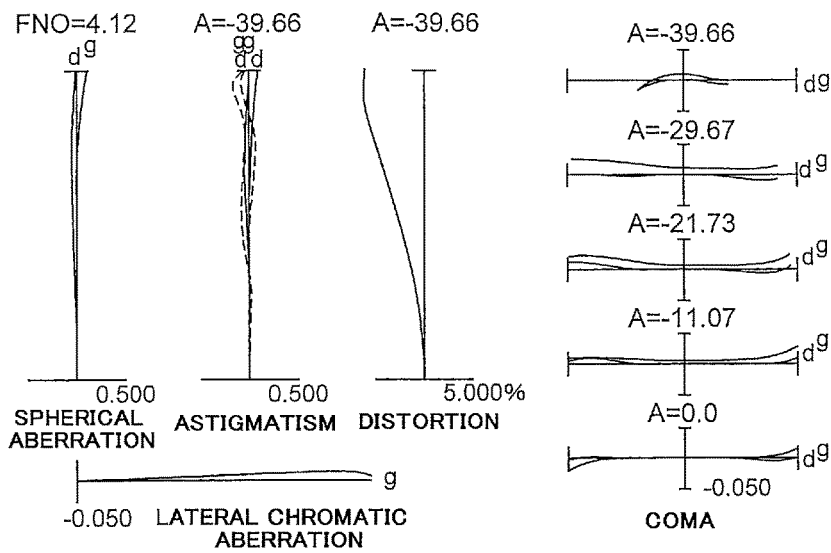
FIGS. 8A, 8B and 8C are graphs showing various aberrations of the variable magnification optical system according to the Third Example of the present application upon focusing on an infinite distance object, in the wide-angle end state, in the intermediate focal length state, and in the telephoto end state, respectively.
Figure 8B:
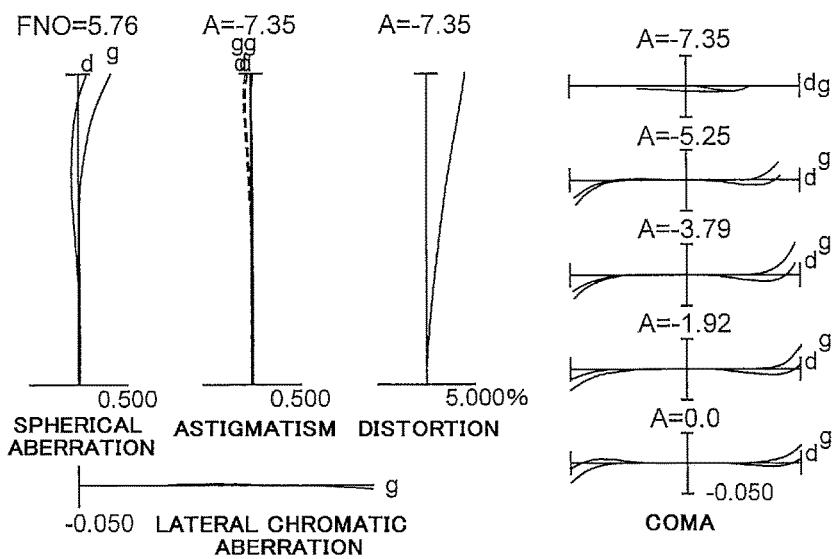
Figure 8C:
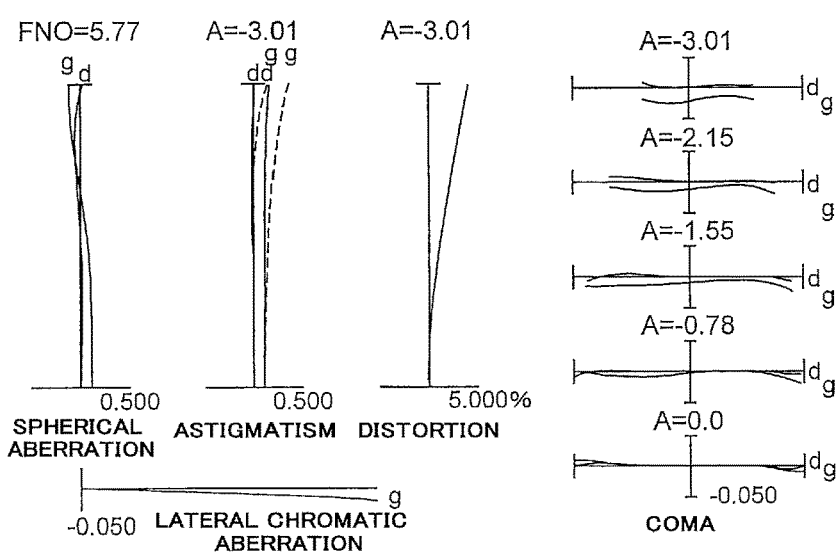

FIGS. 8A, 8B and 8C are graphs showing various aberrations of the variable magnification optical system according to the Third Example of the present application upon focusing on an infinite distance object, in the wide-angle end state, in the intermediate focal length state, and in the telephoto end state, respectively.

Figure 9A:
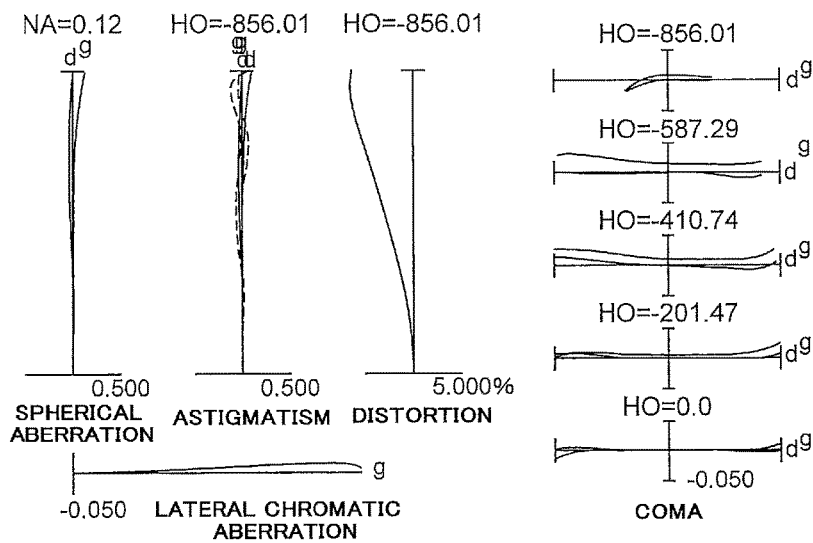
FIGS. 9A, 9B and 9C are graphs showing various aberrations of the variable magnification optical system according to the Third Example of the present application upon focusing on the close distance object (shooting magnification −0.0100), in the wide angle end state, in the intermediate focal length state and in the telephoto end state, respectively.
Figure 9B:
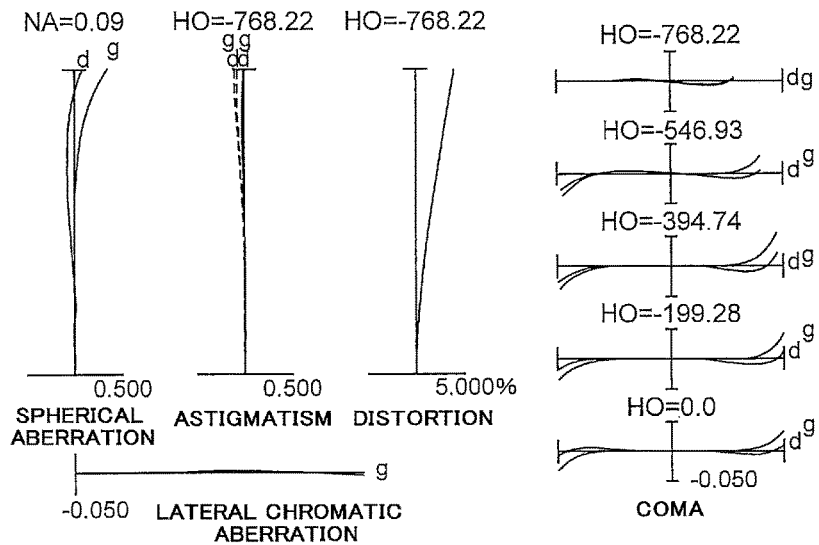
Figure 9C:
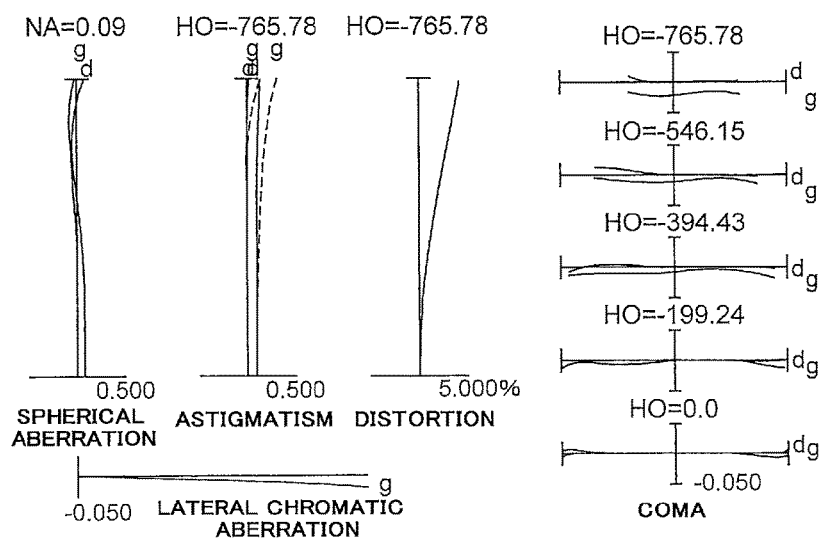

FIGS. 9A, 9B and 9C are graphs showing various aberrations of the variable magnification optical system according to the Third Example of the present application upon focusing on a close distance object, in the wide-angle end state, in the intermediate focal length state and in the telephoto end state (shooting magnification is −0.0100), respectively.

As is apparent from the respective graphs, the variable magnification optical system according to the present Example shows good corrections to various aberrations from the wide-angle end state to the telephoto end state and from a focusing state on an infinitely distant object to a focusing state on a short distance object, and also shows a high optical performance.

Fourth Example

Figure 10A:
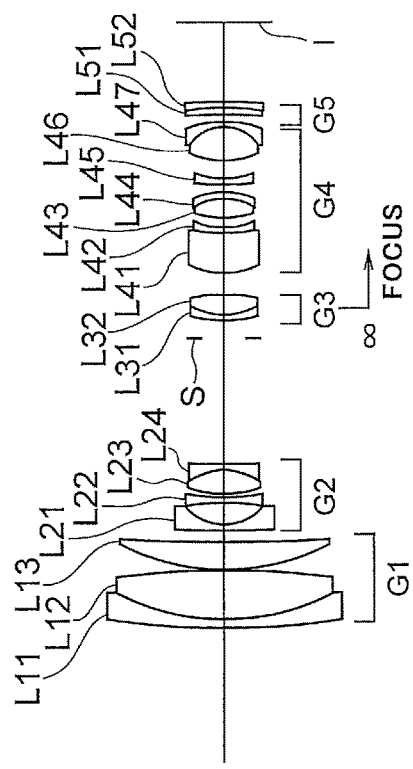
FIGS. 10A, 10B and 10C are sectional views showing a variable magnification optical system according to a Fourth Example common to the first to the fourth embodiments of the present application, in a wide-angle end state, in an intermediate focal length state and in a telephoto end state, respectively.
Figure 10B:
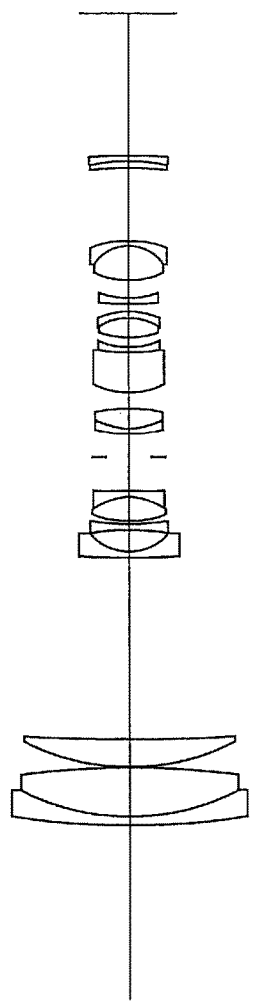
Figure 10C:
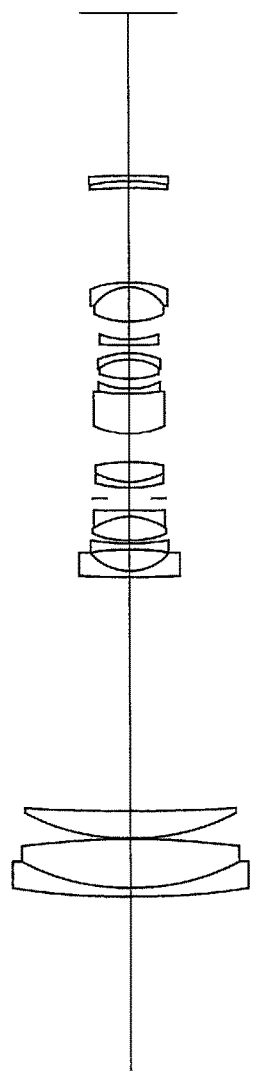

FIGS. 10A, 10B and 10C are sectional views showing a variable magnification optical system according to the Fourth Example which is common to the first to fourth embodiments of the present application, in a wide-angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having negative refractive power. An aperture stop S is disposed between the second lens group G2 and the third lens group G3.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22 and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a negative meniscus lens L45 having a convex surface facing the object side, and a cemented lens constructed by a double convex positive lens L46 cemented with a negative meniscus lens L47 having a concave surface facing the object side. Meanwhile, the negative meniscus lens L45 is a glass mold type aspherical lens of which a lens surface on the object side is formed into an aspherical shape, and the negative meniscus lens L47 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon varying magnification from the wide-angle end state to the telephoto end state, the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the image plane I are varied, respectively.

To be specific, the first lens group G1 to the fifth lens group G5 are moved toward the object side. Meanwhile, the aperture stop S is moved toward the object side integrally with the fourth lens group G4 upon varying magnification.

Focusing from an infinitely distant object to a close distance object is carried out by moving the third lens group G3 along the optical axis toward the image plane I.

Consequently, upon varying magnification, the distance between the first lens group G1 and the second lens group G2 is increased, the distance between the second lens group G2 and the third lens group G3 is decreased, the distance between the fourth lens group G4 and the fifth lens group G5 is increased, and the distance between the fifth lens group G5 and the image plane I is increased. The distance between the third lens group G3 and the fourth lens group G4 is decreased from the wide angle end state to the intermediate focal length state, and is increased from the intermediate focal length state to the telephoto end state. Meanwhile, upon varying magnification, a distance between the aperture stop S and the third lens group G3 is increased from the wide angle end state to the intermediate focal length state, and is decreased from the intermediate focal length state to the telephoto end state.

Due to the aboves, the variable magnification optical system according to the present Example has high variable magnification ratio and is compact in size.

Table 4 below shows various values of the variable magnification optical system according to the present Example.

TABLE 4

Fourth Example

[Surface Data]

| m | r | d | nd | νd |
|---|---|---|---|---|
| OP | ∞ | | | |
| 1 | 128.6583 | 1.6350 | 1.950000 | 29.37 |
| 2 | 43.3153 | 8.5924 | 1.497820 | 82.57 |
| 3 | −200.5952 | 0.1000 | | |
| 4 | 41.6932 | 4.9416 | 1.816000 | 46.59 |
| 5 | 226.2028 | variable | | |
| *6 | 500.0000 | 1.0000 | 1.851348 | 40.10 |
| 7 | 9.4698 | 3.7102 | | |
| 8 | −51.4849 | 1.0000 | 1.883000 | 40.66 |
| 9 | 32.3052 | 0.4591 | | |
| 10 | 17.6836 | 4.3937 | 1.808090 | 22.74 |
| 11 | −11.5727 | 1.0000 | 1.902650 | 35.72 |
| 12 | 68.1728 | variable | | |
| 13(S) | ∞ | variable | | |
| 14 | 23.9084 | 1.0000 | 1.883000 | 40.66 |
| 15 | 12.0540 | 3.5286 | 1.593190 | 67.90 |
| 16 | −41.2723 | variable | | |
| 17 | 13.3372 | 7.1262 | 1.816000 | 46.59 |
| 18 | 23.6925 | 1.0000 | 1.850260 | 32.35 |
| 19 | 10.6208 | 2.0000 | | |
| 20 | 22.6183 | 3.2312 | 1.516800 | 63.88 |
| 21 | −10.6478 | 1.0000 | 1.850260 | 32.35 |
| 22 | −17.8847 | 1.5000 | | |
| *23 | 88.9298 | 1.0000 | 1.806100 | 40.73 |
| 24 | 14.7135 | 3.2670 | | |
| 25 | 17.6589 | 5.9445 | 1.567320 | 42.58 |
| 26 | −8.0000 | 1.0000 | 1.851348 | 40.10 |
| *27 | −23.1716 | variable | | |
| 28 | −86.3077 | 1.3257 | 1.497820 | 82.57 |
| 29 | −40.4370 | 1.0000 | 1.834410 | 37.28 |
| *30 | −70.0000 | BF | | |
| I | ∞ | | | |

[Aspherical Data]

m: 6

| κ | 11.00000 |
| A4 | 2.16452E−05 |

TABLE 4-continued

Fourth Example

| | |
|---|---|
| A6 | −6.30268E−08 |
| A8 | −2.73814E−09 |
| A10 | 5.05766E−11 |
| A12 | −2.61890E−13 |
| m: 23 | |
| κ | 1.00000 |
| A4 | −2.28843E−05 |
| A6 | 8.75761E−07 |
| A8 | −2.20702E−08 |
| A10 | 4.21746E−10 |
| A12 | 0.00000E+00 |
| m: 27 | |
| κ | 1.00000 |
| A4 | −8.32547E−05 |
| A6 | −6.55824E−08 |
| A8 | 1.23463E−09 |
| A10 | −5.63694E−11 |
| A12 | 0.00000E+00 |
| m: 30 | |
| κ | 1.00000 |
| A4 | 3.80084E−05 |
| A6 | −2.56034E−08 |
| A8 | 4.99788E−11 |
| A10 | 0.00000E+00 |
| A12 | 0.00000E+00 |

[Various Data]
Variable magnification ratio 14.13

| | W | T |
|---|---|---|
| f | 10.30~ | 145.50 |
| FNO | 4.12~ | 5.85 |
| ω | 39.50~ | 3.03° |
| Y | 8.00~ | 8.00 |
| TL | 107.35~ | 157.35 |

| | W | M | T |
|---|---|---|---|
| f | 10.30000 | 59.49985 | 145.49848 |
| ω | 39.49758 | 7.41063 | 3.03486 |
| FNO | 4.12 | 5.76 | 5.85 |
| φ | 8.71 | 8.62 | 10.14 |
| d5 | 2.10000 | 32.37072 | 41.89456 |
| d12 | 22.31334 | 6.07934 | 2.20000 |
| d13 | 3.17825 | 4.10045 | 1.80000 |
| d16 | 3.82220 | 2.90000 | 5.20045 |
| d27 | 1.23135 | 12.66515 | 16.54997 |
| BF | 13.94909 | 25.45018 | 28.94846 |

[Movement Amount of Focusing Group upon focusing]

| | W | M | T |
|---|---|---|---|
| Shooting magnification | −0.0100 | −0.0100 | −0.0100 |
| Shooting distance | 1003.5628 | 5791.2514 | 14169.5696 |
| Amount of movement | 0.1205 | 0.1520 | 0.2832 |

[Lens Group Data]

| Group | ST | f |
|---|---|---|
| 1 | 1 | 63.10081 |
| 2 | 6 | −8.44812 |
| 3 | 14 | 37.00000 |
| 4 | 17 | 42.46436 |
| 5 | 28 | −485.09743 |

[Values for Conditional Expressions]

| | |
|---|---|
| (1-1) | $(-f2)/ft = 0.058$ |
| (1-2) | $f3/fw = 3.592$ |
| (1-3) | $(d4t - d4w)/f4 = 0.361$ |
| (1-4) | $(d5it - d5iw)/(d3it - d3iw) = 0.473$ |
| (2-1) | $f3/fw = 3.592$ |

TABLE 4-continued

Fourth Example

| | |
|---|---|
| (2-2) | $(d1it - d1iw)/fw = 4.854$ |
| (2-3) | $(d5it - d5iw)/(d3it - d3iw) = 0.473$ |
| (2-4) | $f3/f4 = 0.871$ |
| (3-1) | $(d4t - d4w)/f4 = 0.361$ |
| (3-2) | $f3/fw = 3.592$ |
| (3-3) | $(d1it - d1iw)/fw = 4.854$ |
| (3-4) | $f3/ft = 0.254$ |
| (4-1) | $(d5it - d5iw)/(d3it - d3iw) = 0.473$ |
| (4-2) | $(d4t - d4w)/f4 = 0.361$ |
| (4-3) | $(-f2)/ft = 0.058$ |
| (4-4) | $f3/f4 = 0.871$ |

Figure 11A:
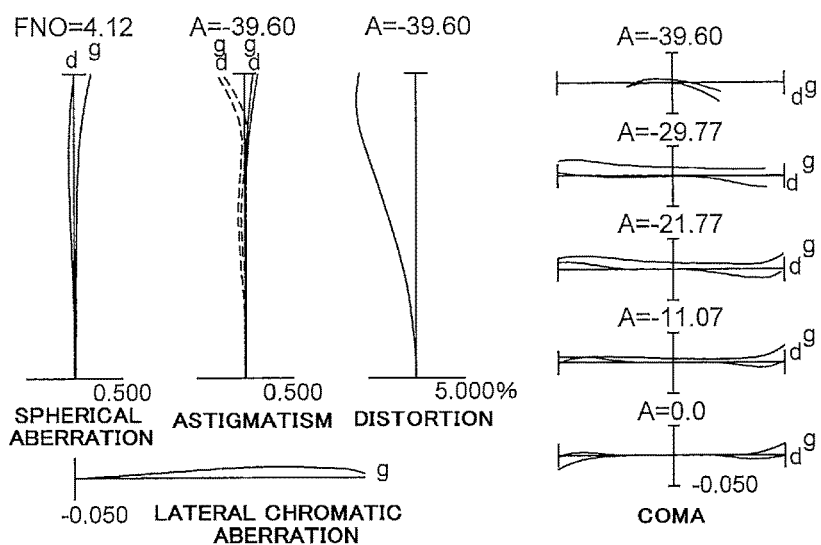
FIGS. 11A, 11B and 11C are graphs showing various aberrations of the variable magnification optical system according to the Fourth Example of the present application upon focusing on an infinite distance object, in the wide-angle end state, in the intermediate focal length state, and in the telephoto end state, respectively.
Figure 11B:
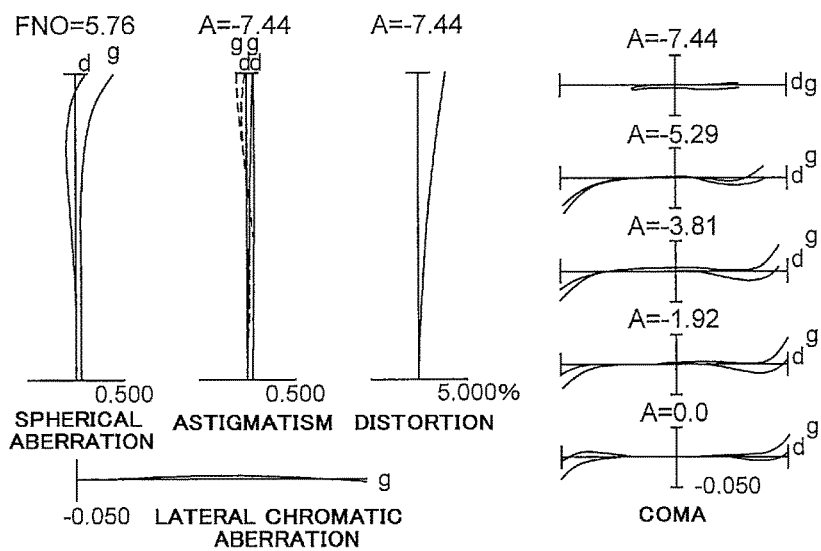
Figure 11C:
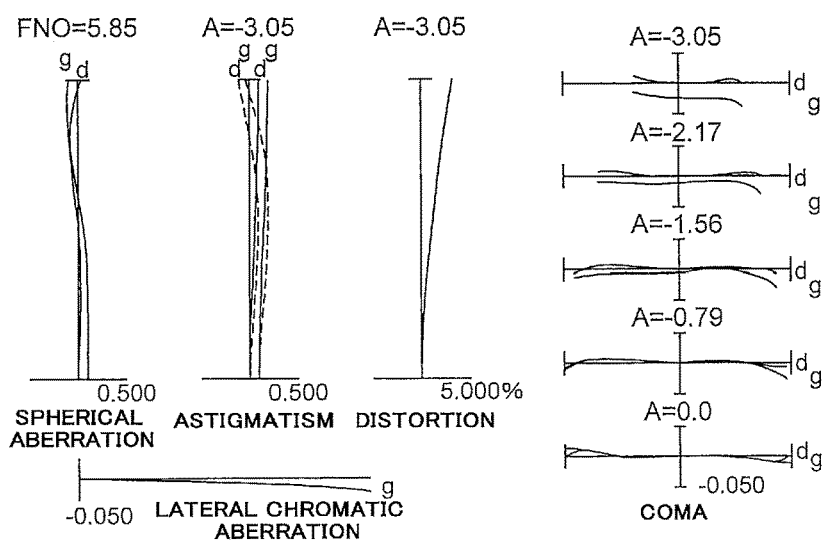

FIGS. 11A, 11B and 11C are graphs showing various aberrations of the variable magnification optical system according to the Fourth Example of the present application upon focusing on an infinite distance object, in the wide-angle end state, in the intermediate focal length state, and in the telephoto end state, respectively.

Figure 12A:
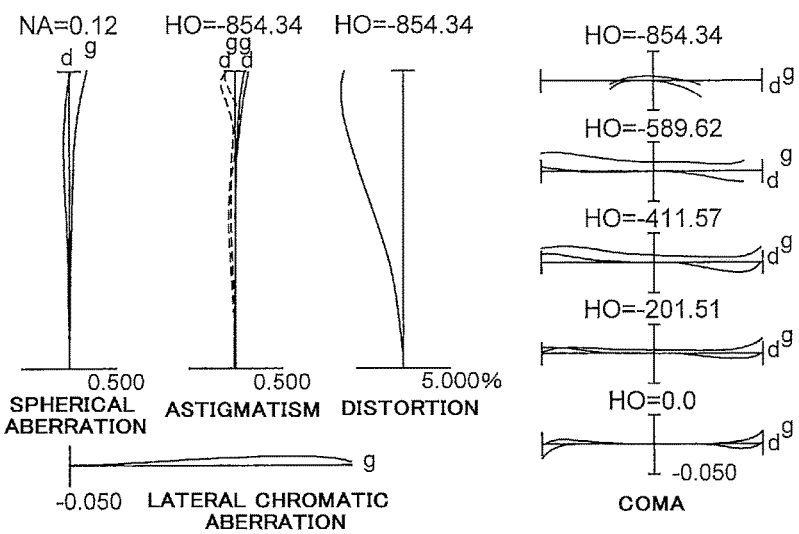
FIGS. 12A, 12B and 12C are graphs showing various aberrations of the variable magnification optical system according to the Fourth Example of the present application upon focusing on the close distance object (shooting magnification −0.0100), in the wide angle end state, in the intermediate focal length state and in the telephoto end state, respectively.
Figure 12B:
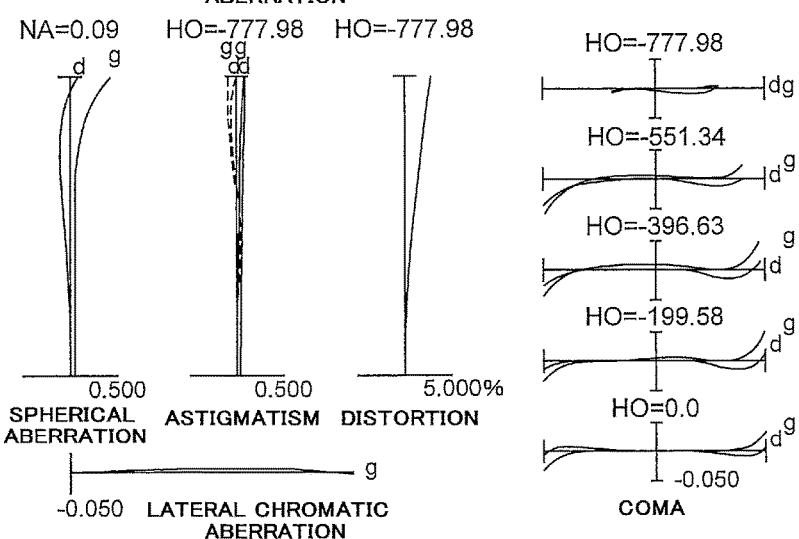
Figure 12C:
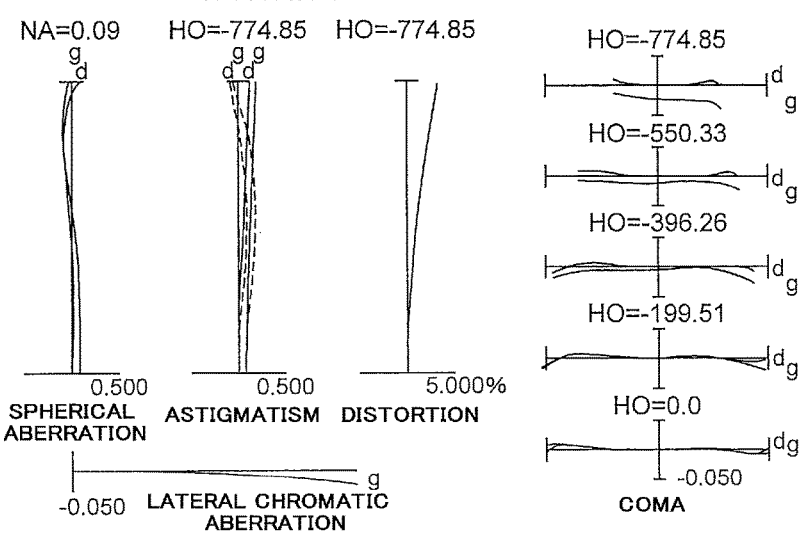

FIGS. 12A, 12B and 12C are graphs showing various aberrations of the variable magnification optical system according to the Fourth Example of the present application upon focusing on a close distance object, in the wide-angle end state, in the intermediate focal length state and in the telephoto end state, respectively (shooting magnification is −0.0100).

As is apparent from the respective graphs, the variable magnification optical system according to the present Example shows good corrections to various aberrations from the wide-angle end state to the telephoto end state and from a focusing state on an infinitely distant object to a focusing state on a short distance object, and also shows a high optical performance.

According to the Examples as above-mentioned, it is possible to realize a small-size variable magnification optical system having a high variable magnification ratio and a high optical performance.

Note that each of the above described Examples is a concrete example of the invention of the present application, and the invention of the present application is not limited to them. The contents described below can be adopted without deteriorating an optical performance of the variable magnification optical systems of the present application.

Although the variable magnification optical systems each having five group configuration were illustrated above as numerical examples of the variable magnification optical systems according to the first embodiment to the fourth embodiment of the present application, the present application is not limited to them and the variable magnification optical systems having other configurations (such as six group configuration, seven group configuration and the like) can be configured. Concretely, a lens configuration that a lens or a lens group is added to the most object side or to the most image side of the variable magnification optical system according to the first embodiment to the fourth embodiment of the present application is possible. Meanwhile, a lens group indicates a part including at least one lens, separated by air spaces being variable upon varying magnification.

Further, in the variable magnification optical system according to the first embodiment to the fourth embodiment of the present application, a portion of a lens group, a single lens group in the entirety thereof, or a plurality of lens groups can be moved in the direction of the optical axis as a focusing lens group in order to carry out focusing from an infinitely distant object to a close distance object. In the variable magnification optical system according to the first embodiment to the fourth embodiment of the present application, examples in which the third lens group in the entirety thereof is adopted as a focusing lens group, have been illustrated, but it is possible to adopt at least a portion of the first lens group, or at least a portion of the second lens group, or at least a portion of the third lens group, or at least a portion of the fourth lens group, or at least a portion of the fifth lens group, or any combination of them, is adopted as the focusing lens group. The focusing lens group can be used for auto focus, and suitable for being driven by a motor for auto focus such as an ultrasonic motor.

Further, in the variable magnification optical systems according to the first embodiment to the fourth embodiment of the present application, any lens group in the entirety thereof or a portion thereof can be so moved, as a vibration reduction lens group, to have a component in a direction perpendicular to the optical axis, or rotationally moved (swayed) in an intra-plane direction including the optical axis for correcting an image blur caused by a camera shake. Particularly, in the variable magnification optical systems according to the first embodiment to the fourth embodiment of the present application, it is preferable that at least a portion of the second lens group or at least a portion of the third lens group or at least a portion of the fourth lens group or at least a portion of the fifth lens group is used as a vibration reduction lens group.

Further, in the variable magnification optical systems according to the first embodiment to the fourth embodiment of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical systems according to the first embodiment to the fourth embodiment of the present application, an aperture stop is disposed in the vicinity of the third lens group, and the function may be substituted by a lens frame without disposing a member as an aperture stop.

Moreover, the lens surface(s) of the lenses configuring the variable magnification optical systems according to the first embodiment to the fourth embodiment of the present application may be coated with anti-reflection coating(s) having a high transmittance in a broad wavelength range. With this contrivance, it is feasible to reduce a flare as well as ghost and attain a high optical performance with high contrast.

Next, a camera equipped with the variable magnification optical system according to the first embodiment to the fourth embodiment of the present application, will be explained with referring to FIG. 13.

Figure 13:
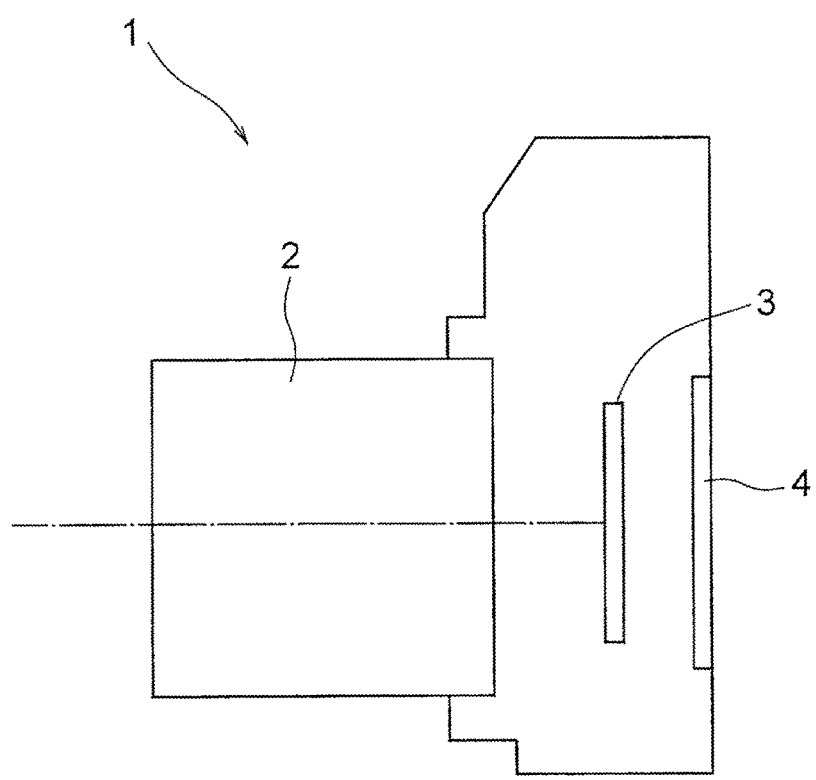
FIG. 13 is a schematic view showing a construction of a camera equipped with the variable magnification optical system according to the first to the fourth embodiments of the present application.

FIG. 13 is a view showing a configuration of a camera equipped with the variable magnification optical system according to the first embodiment to the fourth embodiment of the present application.

A camera 1 is a lens interchangeable type so-called mirror-less camera equipped with the variable magnification optical system according to the First Example as an imaging lens 2, as shown in FIG. 13.

In the camera 1, light emitted from an unillustrated object (an object to be imaged) is collected by the imaging lens 2, and forms an image of the object to be imaged on an imaging plane of an imaging part 3 through an unillustrated OLPF (optical low pass filter). The image of the object to be imaged is photo-electronically converted through a photo-electronic conversion element provided in the imaging part 3 to form an object image. This object image is displayed on an EVF (electronic view finder) 4 provided on the camera 1. Thus, a photographer can observe the object image through the EVF 4.

When the photographer presses an unillustrated release button, the object image formed through the imaging part 3 is stored in an unillustrated memory. Thus, the photographer can take a picture of the object to be imaged by the camera 1.

The variable magnification optical system according to the First Example mounted on the camera 1 as the imaging lens 2 is a small-sized variable magnification optical system having a high variable magnification ratio and a high optical performance. Accordingly, the camera 1 can realize downsizing and a high optical performance while being provided with a high variable magnification ratio. Incidentally, even if the camera is so composed that the variable magnification optical system according to the Second to Fourth Examples is mounted on the camera as the imaging lens 2, the same effect can be attained as the camera 1. Moreover, the same effect as the above camera 1 is attained even in the case where the variable magnification optical system according to each of Examples as described, is mounted on a single lens reflex-type camera which is provided with a quick return mirror and in which an object to be imaged is observed through a finder optical system.

Finally, an outline of a method for manufacturing a variable magnification optical system according to the first embodiment to the fourth embodiment of the present application is described with referring to FIGS. 14 to 17.

Figure 14:
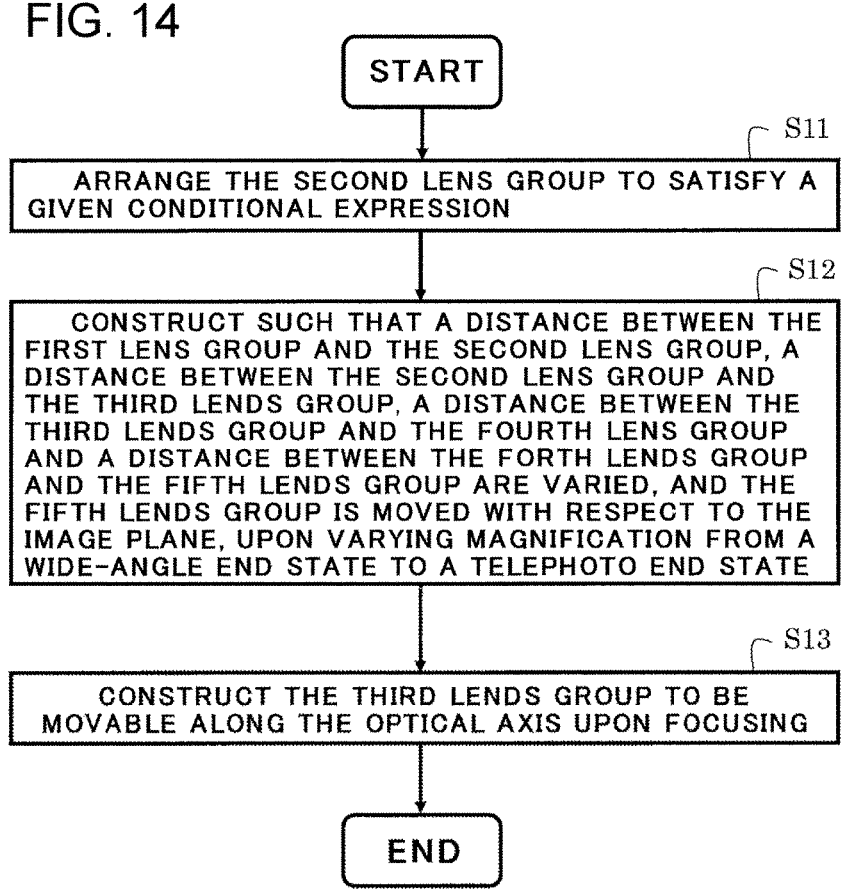
FIG. 14 is a flowchart schematically showing a method for manufacturing the variable magnification optical system according to the first embodiment of the present application.

In a method for manufacturing a variable magnification optical system according to the first embodiment of the present application, as shown in FIG. 14, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S11, S12 and S13:

Step S11: arrange the second lens group to satisfy the following conditional expression (1-1) and dispose the respective lens groups in a lens barrel in order from the object side:

$$0.030<(-f2)/ft<0.120 \quad (1\text{-}1)$$

where ft denotes a whole system focal length of the variable magnification optical system in the tele photo end state, and f2 denotes a focal length of the second lens group.

Step S12: by, for example, providing a known movement mechanism at the lens barrel, construct such that a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane, upon varying magnification from the wide-angle end state to the telephoto end state.

Step S13: by, for example, providing a known movement mechanism at the lens barrel, construct the third lens group to be movable along the optical axis upon focusing.

Thus, the method for manufacturing the variable magnification optical system according to the first embodiment of the present application can manufacture a small-size variable magnification optical system having a high variable magnification ratio and a high optical performance.

Figure 15:
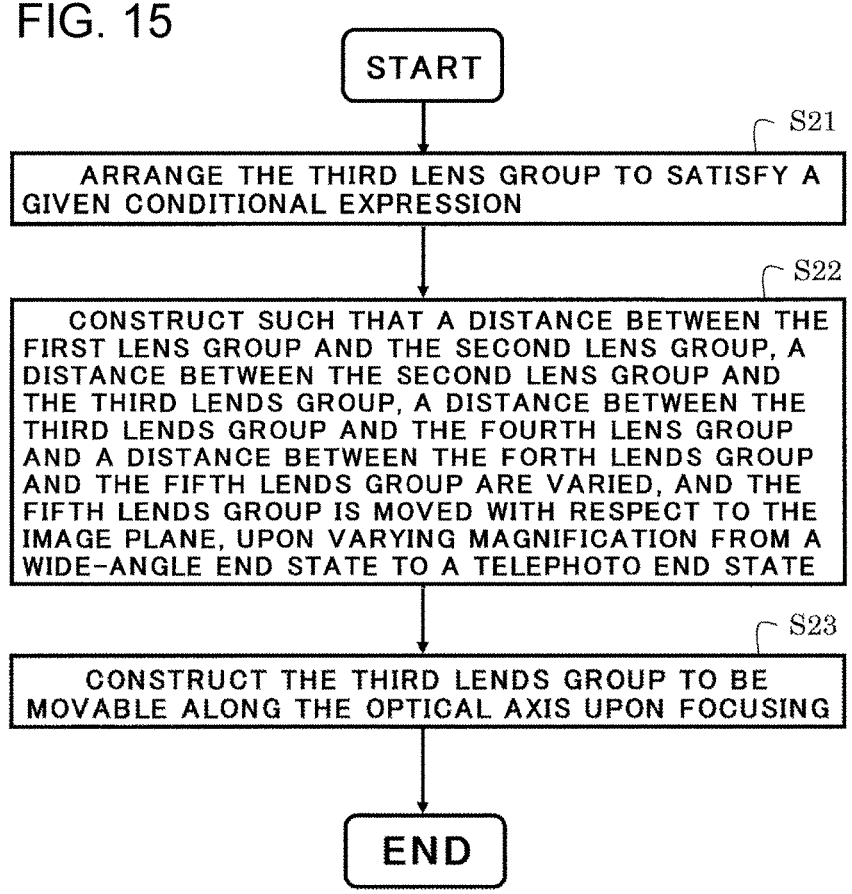
FIG. 15 is a flowchart schematically showing a method for manufacturing the variable magnification optical system according to the second embodiment of the present application.

Next, an outline of a method for manufacturing a variable magnification optical system according to the second embodiment of the present application is described with referring to FIG. 15.

In a method for manufacturing a variable magnification optical system according to the second embodiment of the present application, as shown in FIG. 15, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S21, S22 and S23:

Step S21: arrange the third lens group to satisfy the following conditional expressions (2-1) and disposing the respective lens groups in a lens barrel in order from the object side:

$$2.970 < f3/fw < 10.000 \quad (2\text{-}1)$$

where fw denotes a whole system focal length of the variable magnification optical system in the wide angle end state, and f3 denotes a focal length of the third lens group.

Step S22: by, for example, providing a known movement mechanism at the lens barrel, construct such that a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane, upon varying magnification from the wide-angle end state to the telephoto end state.

Step S23: by, for example, providing a known movement mechanism at the lens barrel, construct the third lens group to be movable along the optical axis upon focusing.

Thus, the method for manufacturing the variable magnification optical system according to the second embodiment of the present application can manufacture a small-size variable magnification optical system having a high variable magnification ratio and a high optical performance.

Figure 16:
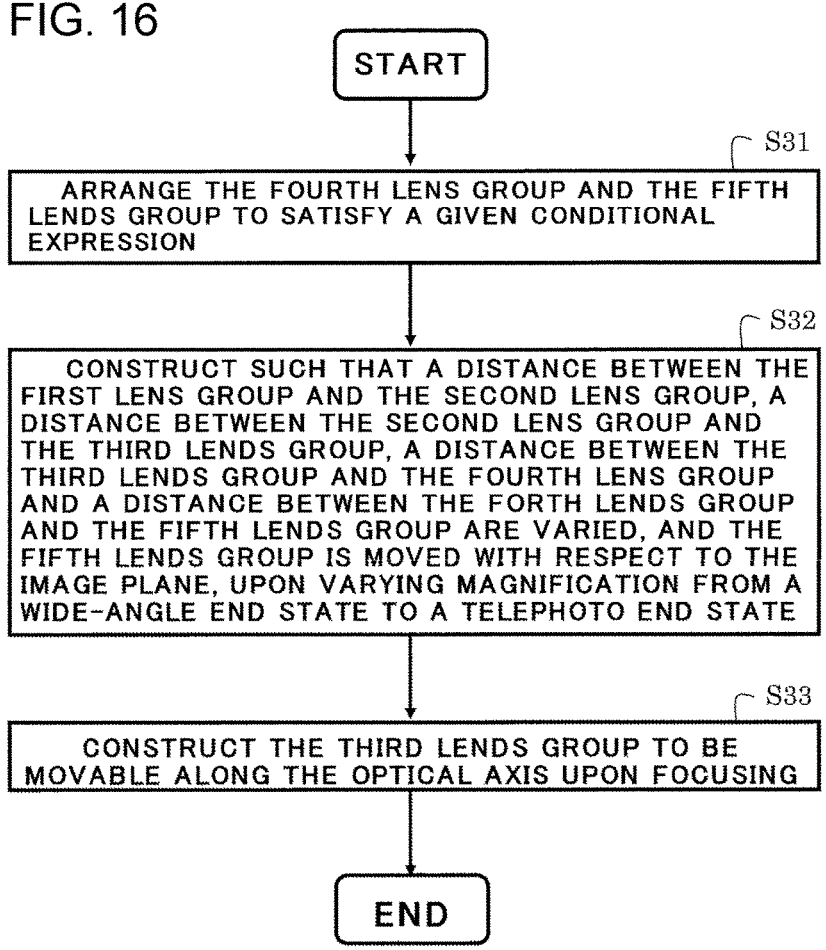
FIG. 16 is a flowchart schematically showing a method for manufacturing the variable magnification optical system according to the third embodiment of the present application.

Next, an outline of a method for manufacturing a variable magnification optical system according to the third embodiment of the present application is described with referring to FIG. 16.

In a method for manufacturing a variable magnification optical system according to the third embodiment of the present application, as shown in FIG. 16, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S31, S32 and S33:

Step S31: arrange the fourth lens group and the fifth lens group to satisfy the following conditional expression (3-1) and disposing the respective lens groups in a lens barrel in order from the object side:

$$0.010 < (d4t-d4w)/f4 < 1.000 \quad (3\text{-}1)$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide angle end state; and f4 denotes a focal length of the fourth lens group.

Step S32: by, for example, providing a known movement mechanism at the lens barrel, construct such that a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane, upon varying magnification from the wide-angle end state to the telephoto end state.

Step S33: by, for example, providing a known movement mechanism at the lens barrel, construct the third lens group to be movable along the optical axis upon focusing.

Thus, the method for manufacturing the variable magnification optical system according to the third embodiment of the present application can manufacture a small-size variable magnification optical system having a high variable magnification ratio and a high optical performance.

Figure 17:
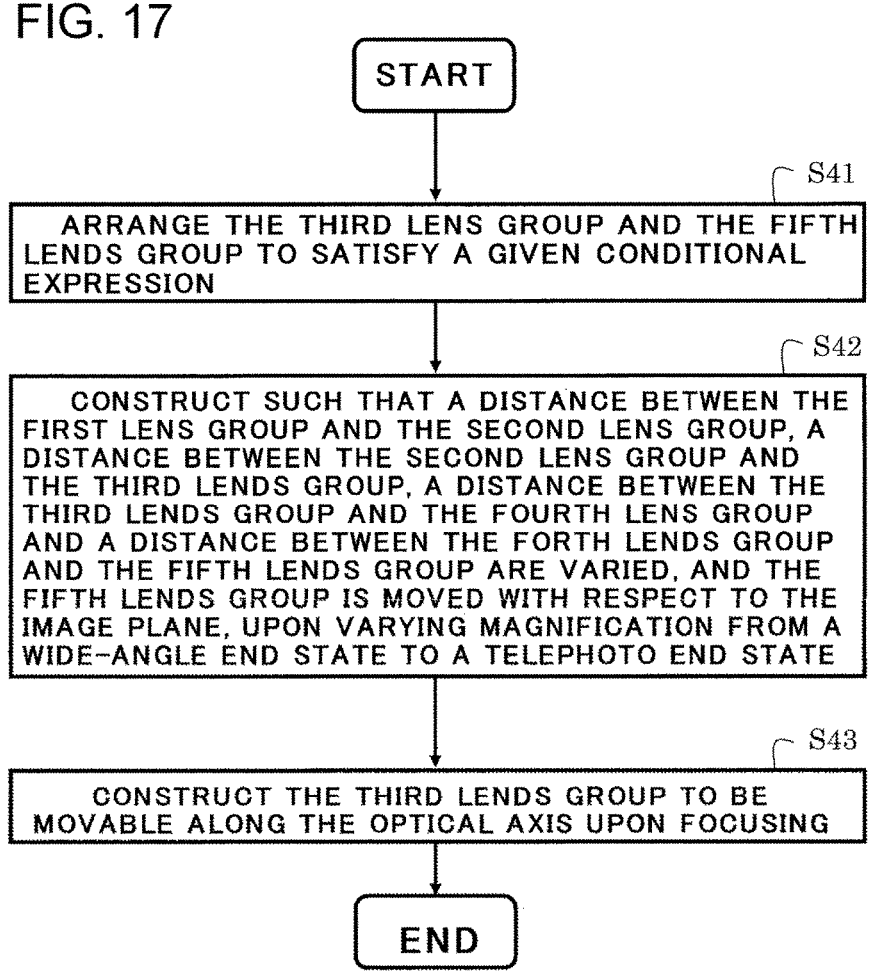
FIG. 17 is a flowchart schematically showing a method for manufacturing the variable magnification optical system according to the fourth embodiment of the present application.

Next, an outline of a method for manufacturing a variable magnification optical system according to the fourth embodiment of the present application is described with referring to FIG. 17.

In a method for manufacturing a variable magnification optical system according to the fourth embodiment of the present application, as shown in FIG. 17, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S41, S42 and S43:

Step S41: arrange the third lens group and the fifth lens group to satisfy the following conditional expression (4-1) and disposing the respective lens groups in a lens barrel in order from the object side:

$$0.010 < (d5it-d5iw)/(d3it-d3iw) < 1.000 \quad (4\text{-}1)$$

where d3it denotes a distance along the optical axis from a most image side lens surface of the third lens group in the telephoto end state to the image plane;

d3iw denotes a distance along the optical axis from the most image side lens surface of the third lens group in the wide angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide angle end state to the image plane.

Step S42: by, for example, providing a known movement mechanism at the lens barrel, construct such that a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane, upon varying magnification from the wide-angle end state to the telephoto end state.

Step S43: by, for example, providing a known movement mechanism at the lens barrel, construct the third lens group to be movable along the optical axis upon focusing.

Thus, the method for manufacturing the variable magnification optical system according to the fourth embodiment of the present application can manufacture a small-size variable magnification optical system having a high variable magnification ratio and a high optical performance.

What is claimed is:

1. A variable magnification optical system comprising, in order from an object side: a first lens group having positive refractive power; a second lens group having negative refractive power; a third lens group having positive refractive power; a fourth lens group having positive refractive power; and a fifth lens group;

upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;

upon focusing from an infinitely distant object to a close distance object, the third lens group being moved toward the image side along the optical axis; and the following conditional expression being satisfied:

$$0.030 < (-f2)/ft < 0.120$$

where ft denotes a whole system focal length of the variable magnification optical system in the telephoto end state, and f2 denotes a focal length of the second lens group.

2. A variable magnification optical system according to claim 1, wherein the first lens group is moved toward the object side upon varying magnification from the wide-angle end state to the telephoto end state.

3. A variable magnification optical system according to claim 1, wherein the following conditional expression is satisfied:

$$2.970 < f3/fw < 10.000$$

where fw denotes a whole system focal length of the variable magnification optical system in the wide-angle end state, and f3 denotes a focal length of the third lens group.

4. A variable magnification optical system according to claim 1, wherein the following conditional expression is satisfied:

$$0.010 < (d4t - d4w)/f4 < 1.000$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide-angle end state; and f4 denotes a focal length of the fourth lens group.

5. A variable magnification optical system according to claim 1, wherein the following conditional expression is satisfied:

$$0.010 < (d5it - d5iw)/(d3it - d3iw) < 1.000$$

where d3it denotes a distance along the optical axis from a most image side lens surface of the third lens group in the telephoto end state to the image plane;

d3iw denotes a distance along the optical axis from the most image side lens surface of the third lens group in the wide-angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide-angle end state to the image plane.

6. A variable magnification optical system according to claim 1, further comprising an aperture stop, and wherein a distance between the aperture stop and the fourth lens group is not varied upon varying magnification from the wide-angle end state to the telephoto end state.

7. A variable magnification optical system according to claim 1, wherein the distance between the first lens group and the second lens group is increased upon varying magnification from the wide-angle end state to the telephoto end state.

8. A variable magnification optical system according to claim 1, wherein the distance between the second lens group and the third lens group is decreased upon varying magnification from the wide-angle end state to the telephoto end state.

9. A variable magnification optical system according to claim 1, wherein the fifth lens group has positive refractive power.

10. A variable magnification optical system according to claim 1, wherein the following conditional expression is satisfied:

$$2.700 < (d1it - d1iw)/fw < 10.000$$

where fw denotes a whole system focal length of the variable magnification optical system in the wide-angle end state, d1it denotes a distance on the optical axis from a most image side lens surface of the first lens group in the telephoto end state to the image plane, and d1iw denotes a distance on the optical axis from the most image side lens surface of the first lens group in the wide-angle end state to the image plane.

11. A variable magnification optical system according to claim 1, wherein the following conditional expression is satisfied:

$$0.300 < f3/f4 < 1.500$$

where f3 denotes a focal length of the third lens group, and f4 denotes a focal length of the fourth lens group.

12. A variable magnification optical system according to claim 1, wherein the following conditional expression is satisfied:

$$0.010 < f3/ft < 0.650$$

where ft denotes a whole system focal length of the variable magnification optical system in the telephoto end state, and f3 denotes a focal length of the third lens group.

13. A variable magnification optical system according to claim 1, further comprising an aperture stop disposed between the second lens group and the third lens group along the optical axis.

14. An optical apparatus equipped with a variable magnification optical system according to claim 1.

15. A variable magnification optical system comprising, in order from an object side: a first lens group having positive refractive power; a second lens group having negative refractive power; a third lens group having positive refractive power; a fourth lens group having positive refractive power; and a fifth lens group;
- upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;
- upon focusing, the third lens group being moved along the optical axis; and
- the following conditional expressions being satisfied:

$$2.970 < f3/fw < 10.000$$

where fw denotes a whole system focal length of the variable magnification optical system in the wide angle end state, f3 denotes a focal length of the third lens group, d1it denotes a distance on the optical axis from a most image side surface of the first lens group in the telephoto end state to the image plane, and d1iw denotes a distance on the optical axis from the most image side surface of the first lens group in the wide-angle end state to the image plane.

16. A variable magnification optical system according to claim 15, wherein the following conditional expression is satisfied:

$$0.010 < (d5it - d5iw)/(d3it - d3iw) < 1.000$$

where d3it denotes a distance along the optical axis from a most image side lens surface of the third lens group in the telephoto end state to the image plane;
d3iw denotes a distance along the optical axis from the most image side lens surface of the third lens group in the wide-angle end state to the image plane;
d5it denotes a distance along the optical axis from a most image side lens surface of the fifth lens group in the telephoto end state to the image plane; and
d5iw denotes a distance along the optical axis from the most image side lens surface of the fifth lens group in the wide-angle end state to the image plane.

17. A variable magnification optical system according to claim 15, wherein the following conditional expression is satisfied:

$$0.300 < f3/f4 < 1.500$$

where f3 denotes a focal length of the third lens group, and f4 denotes a focal length of the fourth lens group.

18. An optical apparatus equipped with a variable magnification optical system according to claim 15.

19. A variable magnification optical system comprising, in order from an object side: a first lens group having positive refractive power; a second lens group having negative refractive power; a third lens group having positive refractive power; a fourth lens group having positive refractive power; and a fifth lens group;
- upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;
- upon focusing, the third lens group being moved along the optical axis; and
- the following conditional expression being satisfied:

$$0.010 < (d4t - d4w)/f4 < 1.000$$

where d4t denotes a distance along the optical axis from a most image side lens surface of the fourth lens group to a most object side lens surface of the fifth lens group in the telephoto end state;
d4w denotes a distance along the optical axis from the most image side lens surface of the fourth lens group to the most object side lens surface of the fifth lens group in the wide-angle end state; and
f4 denotes a focal length of the fourth lens group.

20. A variable magnification optical system according to claim 19, wherein the following conditional expression is satisfied:

$$2.970 < f3/fw < 10.000$$

where fw denotes a whole system focal length of the variable magnification optical system in the wide-angle end state, and f3 denotes a focal length of the third lens group.

21. A variable magnification optical system according to claim 19, wherein the following conditional expression is satisfied:

$$2.700 < (d1it - d1iw)/fw < 10.000$$

where fw denotes a whole system focal length of the variable magnification optical system in the wide-angle end state, d1it denotes a distance on the optical axis from a most image side lens surface of the first lens group in the telephoto end state to the image plane, and d1iw denotes a distance on the optical axis from the most image side lens surface of the first lens group in the wide-angle end state to the image plane.

22. A variable magnification optical system according to claim 19, wherein the following conditional expression is satisfied:

$$0.010 < f3/ft < 0.650$$

where ft denotes a whole system focal length of the variable magnification optical system in the telephoto end state, and f3 denotes a focal length of the third lens group.

23. An optical apparatus equipped with a variable magnification optical system according to claim 19.

24. A variable magnification optical system comprising, in order from an object side: a first lens group having positive refractive power; a second lens group having negative refractive power; a third lens group having positive refractive power; a fourth lens group having positive refractive power; and a fifth lens group;
- upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied, and the fifth lens group being moved with respect to the image plane;
upon focusing, the third lens group being moved along the optical axis; and
the following conditional expression being satisfied:

$$0.010<(d5it-d5iw)/(d3it-d3iw)<1.000$$

where d3it denotes a distance along the optical axis from a most image side lens surface of the third lens group in the telephoto end state to the image plane;
d3iw denotes a distance along the optical axis from the most image side lens surface of the third lens group in the wide-angle end state to the image plane;
d5it denotes a distance along the optical axis from a most image side lens surface of the fifth lens group in the telephoto end state to the image plane; and
d5iw denotes a distance along the optical axis from the most image side lens surface of the fifth lens group in the wide-angle end state to the image plane.

25. A variable magnification optical system according to claim 24, wherein the following conditional expression is satisfied:

$$0.010<(d4t-d4w)/f4<1.000$$

where d4t denotes a distance along the optical axis from a most image side lens surface of the fourth lens group to a most object side lens surface of the fifth lens group in the telephoto end state;
d4w denotes a distance along the optical axis from the most image side lens surface of the fourth lens group to the most object side lens surface of the fifth lens group in the wide-angle end state; and
f4 denotes a focal length of the fourth lens group.

26. A variable magnification optical system according to claim 24, wherein the following conditional expression is satisfied:

$$0.300<f3/f4<1.500$$

where f3 denotes a focal length of the third lens group, and f4 denotes a focal length of the fourth lens group.

27. An optical apparatus equipped with a variable magnification optical system according to claim 24.

28. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, the method comprising the steps of:
constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane;
arranging the third lens group to move toward the image side along the optical axis upon focusing from an infinitely distant object to a close distance object; and
arranging the second lens group to satisfy the following conditional expression:

$$0.030<(-f2)/ft<0.120$$

where ft denotes a whole system focal length of the variable magnification optical system in the telephoto end state, and f2 denotes a focal length of the second lens group.

29. A method for manufacturing a variable magnification optical system according to claim 28, further comprising a step of constructing such that the following conditional expression is satisfied:

$$2.970<f3/fw<10.000$$

where fw denotes a whole system focal length of the variable magnification optical system in the wide-angle end state, and f3 denotes a focal length of the third lens group.

30. A method for manufacturing a variable magnification optical system according to claim 28, further comprising a step of constructing such that the following conditional expression is satisfied:

$$0.010<(d4t-d4w)/f4<1.000$$

where d4t denotes a distance along the optical axis from a most image side lens surface of the fourth lens group to a most object side lens surface of the fifth lens group in the telephoto end state;
d4w denotes a distance along the optical axis from the most image side lens surface of the fourth lens group to the most object side lens surface of the fifth lens group in the wide-angle end state; and
f4 denotes a focal length of the fourth lens group.

31. A method for manufacturing a variable magnification optical system according to claim 28, further comprising a step of constructing such that the following conditional expression is satisfied:

$$0.010<(d5it-d5iw)/(d3it-d3iw)<1.000$$

where d3it denotes a distance along the optical axis from a most image side lens surface of the third lens group in the telephoto end state to the image plane;
d3iw denotes a distance along the optical axis from the most image side lens surface of the third lens group in the wide-angle end state to the image plane;
d5it denotes a distance along the optical axis from a most image side lens surface of the fifth lens group in the telephoto end state to the image plane; and
d5iw denotes a distance along the optical axis from the most image side lens surface of the fifth lens group in the wide-angle end state to the image plane.

32. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, the method comprising the steps of:
constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane;
arranging the third lens group to be moved along the optical axis upon focusing;

arranging the third lens group to satisfy the following conditional expression:

$$2.970 < f3/fw < 10.000$$

where fw denotes a whole system focal length of the variable magnification optical system in the wide-angle end state, and f3 denotes a focal length of the third lens group; and construct such that the following conditional expression is satisfied:

$$2.700 < (d1it - d1iw)/fw < 10.000$$

where d1it denotes a distance on the optical axis from a most image side lens surface of the first lens group in the telephoto end state to the image plane, and d1iw denotes a distance on the optical axis from the most image side lens surface of the first lens group in the wide-angle end state to the image plane.

33. A method for manufacturing a variable magnification optical system according to claim 32, further comprising a step of constructing such that the following conditional expression is satisfied:

$$0.300 < f3/f4 < 1.500$$

where f3 denotes a focal length of the third lens group, and f4 denotes a focal length of the fourth lens group.

34. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, the method comprising the steps of:

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane;

arranging the third lens group to be moved along the optical axis upon focusing; and arranging the fourth lens group and the fifth lens group to satisfy the following conditional expression:

$$0.010 < (d4t - d4w)/f4 < 1.000$$

where d4t denotes a distance along the optical axis from a most image side lens surface of the fourth lens group to a most object side lens surface of the fifth lens group in the telephoto end state;

d4w denotes a distance along the optical axis from the most image side lens surface of the fourth lens group to the most object side lens surface of the fifth lens group in the wide-angle end state; and f4 denotes a focal length of the fourth lens group.

35. A variable magnification optical system according to claim 34, wherein the following conditional expression is satisfied:

$$0.010 < f3/ft < 0.650$$

where ft denotes a whole system focal length of the variable magnification optical system in the telephoto end state, and f3 denotes a focal length of the third lens group.

36. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, the method comprising the steps of:

constructing such that, upon varying magnification from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, and the fifth lens group is moved with respect to the image plane, arranging the third lens group to be moved along the optical axis upon focusing;

arranging the third lens group and the fifth lens group to satisfy the following conditional expression:

$$0.010 < (d5it - d5iw)/(d3it - d3iw) < 1.000$$

where d3it denotes a distance along the optical axis from a most image side lens surface of the third lens group in the telephoto end state to the image plane;

d3iw denotes a distance along the optical axis from the most image side lens surface of the third lens group in the wide-angle end state to the image plane;

d5it denotes a distance along the optical axis from a most image side lens surface of the fifth lens group in the telephoto end state to the image plane; and d5iw denotes a distance along the optical axis from the most image side lens surface of the fifth lens group in the wide-angle end state to the image plane.

* * * * *